(12) United States Patent
Weresh et al.

(10) Patent No.: US 10,891,879 B1
(45) Date of Patent: Jan. 12, 2021

(54) REPURPOSED PACKAGES

(71) Applicant: Amazon Technologies, Inc., Seattle, WA (US)

(72) Inventors: John Weresh, Bellevue, WA (US); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 349 days.

(21) Appl. No.: 15/899,022

(22) Filed: Feb. 19, 2018

(51) Int. Cl.
*G09F 3/02* (2006.01)
*G06Q 10/08* (2012.01)
*G09F 3/03* (2006.01)
*G09F 3/00* (2006.01)

(52) U.S. Cl.
CPC ....... *G09F 3/0297* (2013.01); *G06Q 10/0832* (2013.01); *G06Q 10/08355* (2013.01); *G09F 3/0335* (2013.01); *G06Q 10/0834* (2013.01)

(58) Field of Classification Search
CPC . G09F 3/0297; G09F 3/0335; G06Q 10/0832; G06Q 10/08355; G06Q 10/0834
USPC .......................................................... 705/332
See application file for complete search history.

(56) References Cited

U.S. PATENT DOCUMENTS

| | | | | |
|---|---|---|---|---|
| 5,417,790 | A * | 5/1995 | Petrou ....................... | G09F 3/10 156/249 |
| 6,737,974 | B2 * | 5/2004 | Dickinson .............. | B65D 81/03 340/572.8 |
| 9,805,329 | B1 * | 10/2017 | Biswas ............ | G06Q 10/08345 |
| 2015/0348282 | A1 * | 12/2015 | Gibbon ............ | G06Q 10/06315 382/103 |
| 2016/0140486 | A1 * | 5/2016 | Tibbs ................ | G06Q 10/08355 705/330 |
| 2017/0008671 | A1 * | 1/2017 | Whitman ................... | B66F 9/06 |
| 2017/0372159 | A1 * | 12/2017 | Schimmel ........... | G06K 9/00744 |
| 2018/0025310 | A1 * | 1/2018 | Gabbai .................. | G06Q 10/04 705/28 |

* cited by examiner

*Primary Examiner* — Jeff Zimmerman
*Assistant Examiner* — Mark C Clare
(74) *Attorney, Agent, or Firm* — Athorus, PLLC

(57) ABSTRACT

Described are systems and methods that enable the repurposing of packages and shipment of items in those repurposed packages. For example, a first user may repurpose a package in which they previously received a shipment and, using a label or identifier already affixed to the package, ship an item to a different delivery destination. The described implementations enable the first user to repurpose a package and ship an item in that repurposed package without having to print a shipping label, weigh the repurposed package, or deliver the repurposed package to a carrier for shipment.

20 Claims, 13 Drawing Sheets

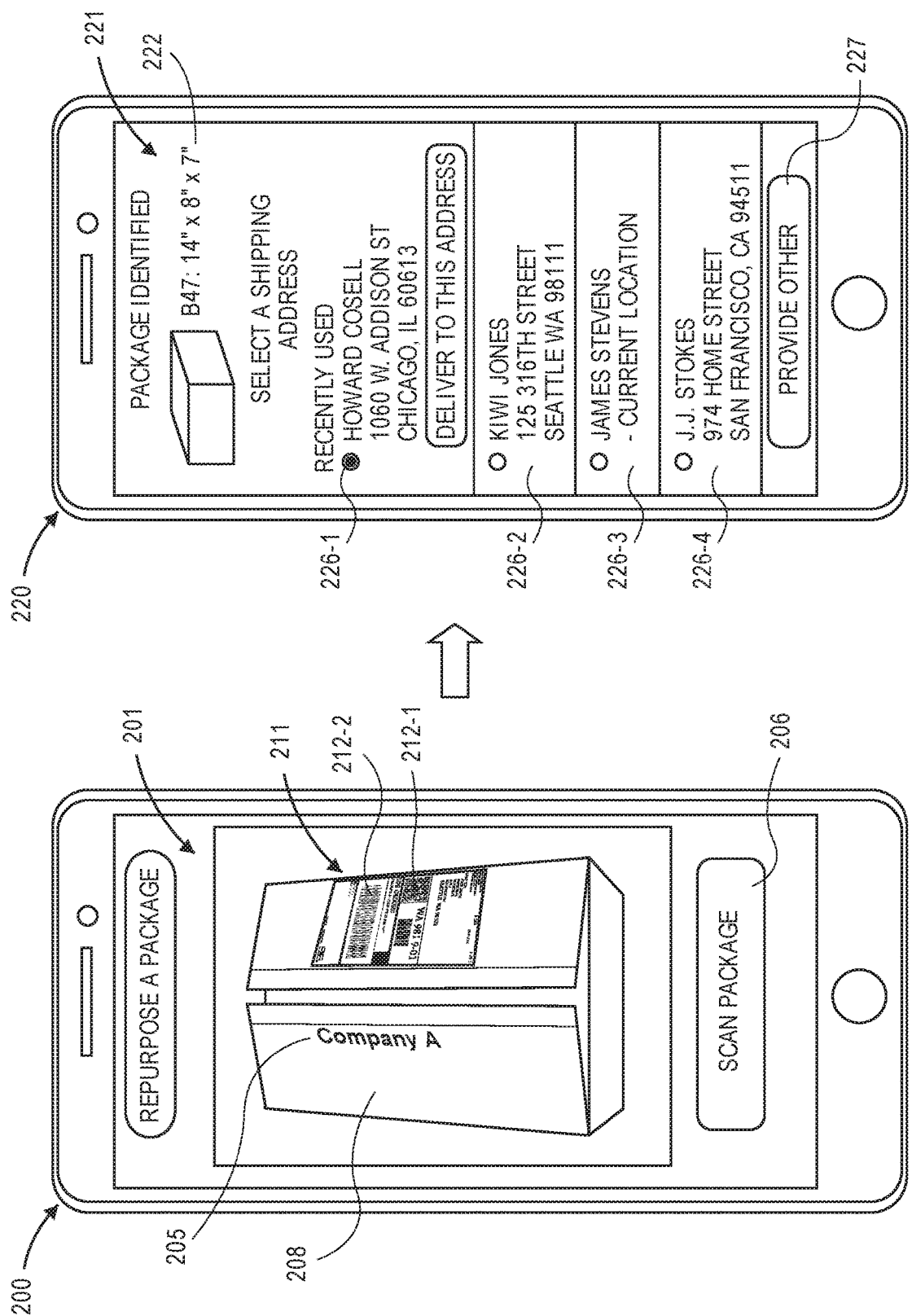

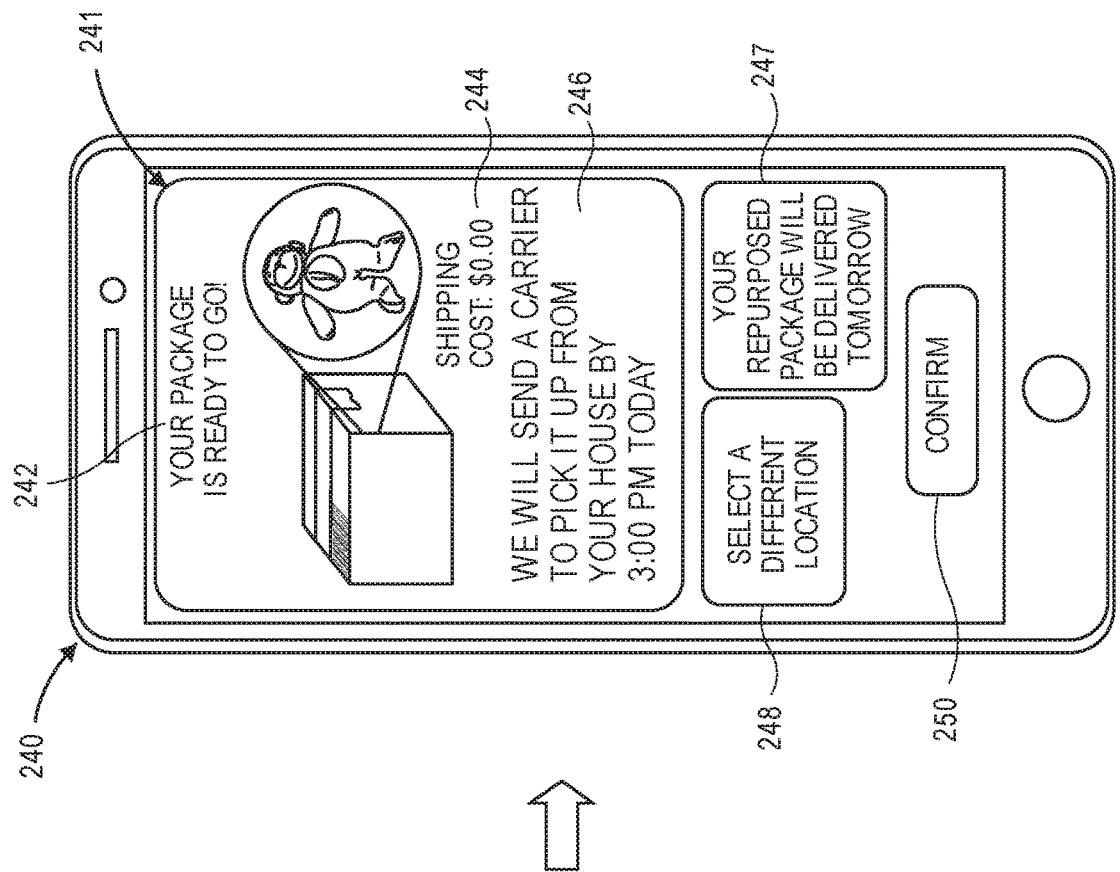
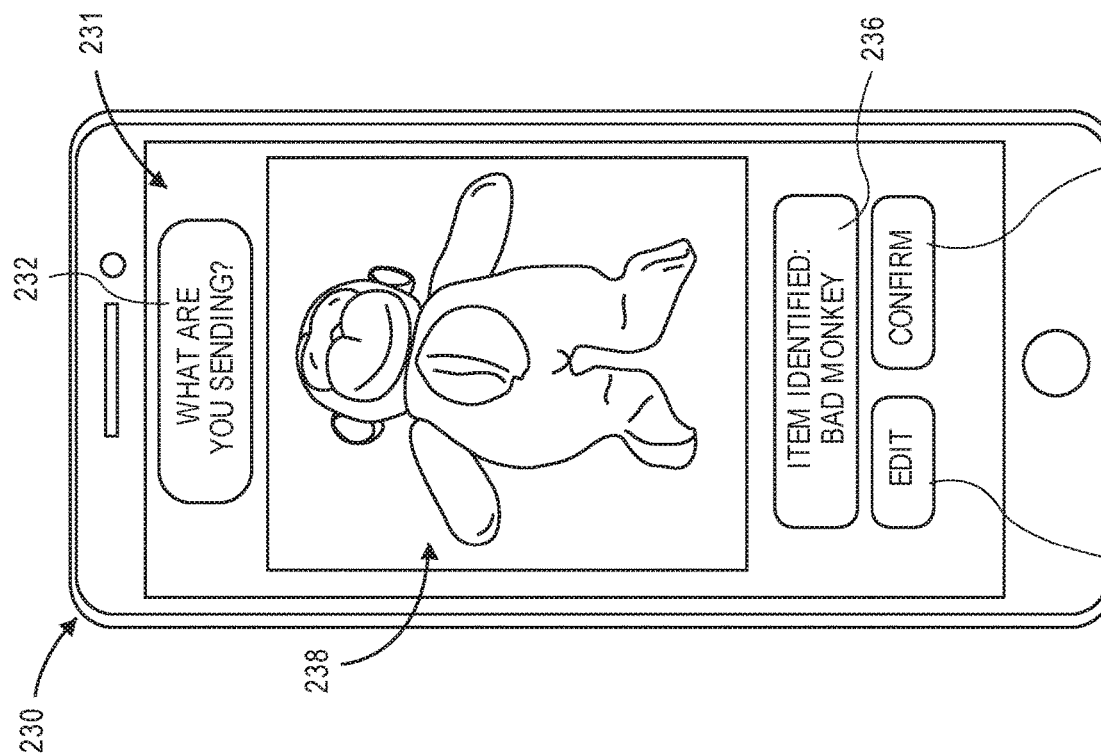
FIG. 2D
FIG. 2C

REPURPOSED PACKAGES

BACKGROUND

Many people purchase items through an electronic commerce marketplace and have those items delivered to customer-specified delivery destinations, such as a customer's home. Items may be picked from inventory locations, packaged into a corrugate box, packing envelope, etc., and shipped to the customer-specified delivery location. When the items are received, the customer opens the package and removes the items. The package is then typically discarded or recycled.

In a similar manner, more and more people are shipping items, using traditional carriers, to other persons (e.g., friends, family, etc.). Generally, the person must pack the item in a box, affix a shipping label to the box, and weigh the box (or determine box dimensions) to calculate the fee required by the carrier to ship the box on behalf of the person. These multiple steps require resources, such as a scale and/or printer, which are often not accessible or convenient to the customer. In addition, the customer is often required to travel to the location of the carrier, or a carrier store, drop off the package and pay for the shipment.

BRIEF DESCRIPTION OF THE DRAWINGS

FIGS. 2A through 2D are illustrations of a user interface used by a user to repurpose a package for shipment, in accordance with implementations of the present disclosure.

DETAILED DESCRIPTION

Figure 1B:
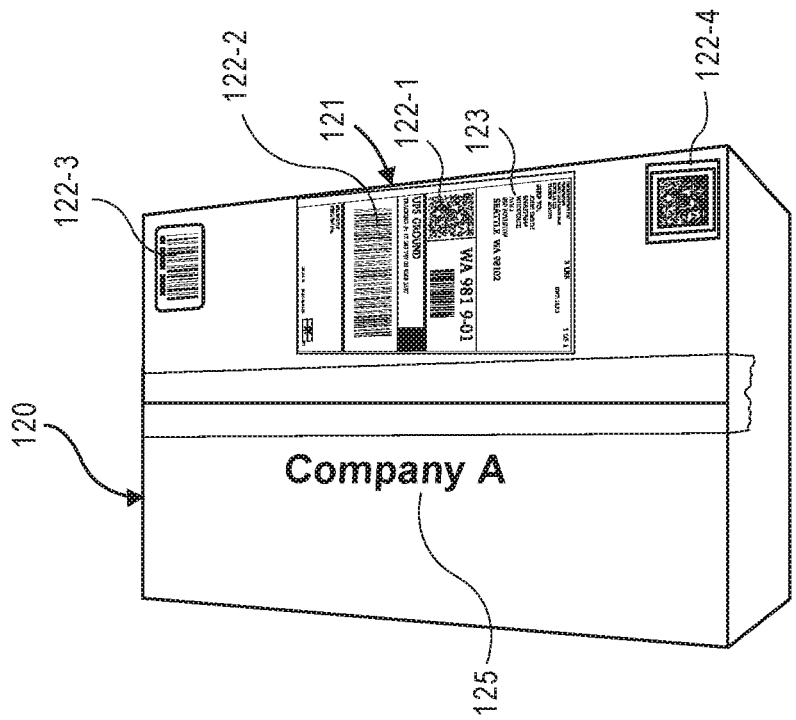
FIGS. 1A through 1E are illustrations of packages with affixed identifiers, in accordance with implementations of the present disclosure.

As set forth in detail below, the present disclosure is directed toward systems and methods that enable the repurposing of packages and shipment of items in those repurposed packages. For example, a first user may receive a package that includes an item s/he ordered via an electronic-commerce ("e-commerce") website. As is typical with carrier-based shipments, the package will have a shipping label affixed thereto that identifies a first delivery destination for the package, such as the first user's home. In accordance with the described implementations, the first user may repurpose the package and ship an item (e.g., the same item or a different item) to a second delivery destination using the same package, referred to herein as a repurposed package, using the already affixed shipping label that was utilized by the carrier in the transport of the package to the first destination. The described implementations enable the first user to repurpose a package and ship an item in that repurposed package without having to print a shipping label, weigh the repurposed package, or deliver the repurposed package to a carrier for shipment.

In some implementations, an identifier, such as a barcode, included on the label that is already affixed to the package is identified, the first user is associated with the identifier as the sender of the repurposed package, and a second destination is associated with the identifier as the second destination for the repurposed package. A carrier may then be assigned to retrieve the repurposed package from a source location (e.g., the first user's home) and route the repurposed package to a materials handling facility, discussed below. At the materials handling facility, the identifier is detected, and a second label is printed and affixed to the repurposed package that identifies the second destination as the destination for the repurposed package. The repurposed package may then be routed through any carrier shipping channels and delivered to the second destination.

In some other implementations, any unique identifier already included on the package may be utilized as the identifier and the source and destination of the repurposed package associated with that identifier. Likewise, in some implementations, as an alternative or in addition to using a visual identifier, an active identifier, such as a radio frequency identification ("RFID") tag may be included in the package and detected for use with the described implementations. Generally, any form of identifier included on a repurposed package may be utilized with the described implementations.

The described implementations are an improvement to existing package shipping technologies because they resolve the deficiencies of existing systems that require the user to print or obtain a new shipping label that is then affixed to the package, weigh the repurposed package and included contents (or determine box dimensions), transport the package to the carrier, and, based on the calculated weight or package dimensions, pay for insurance, and/or pay a fee to a carrier to ship the repurposed package. In addition, the use of an application executing on a device associated with the user enables detection of the identifier already affixed to the package, automatic association of that identifier with the user, presentation of source location(s) and potential delivery destinations already associated with the user, and finally, association of a selected source location and delivery destination with the identifier, thereby repurposing the package with minimal input required by the user.

Figure 1A:
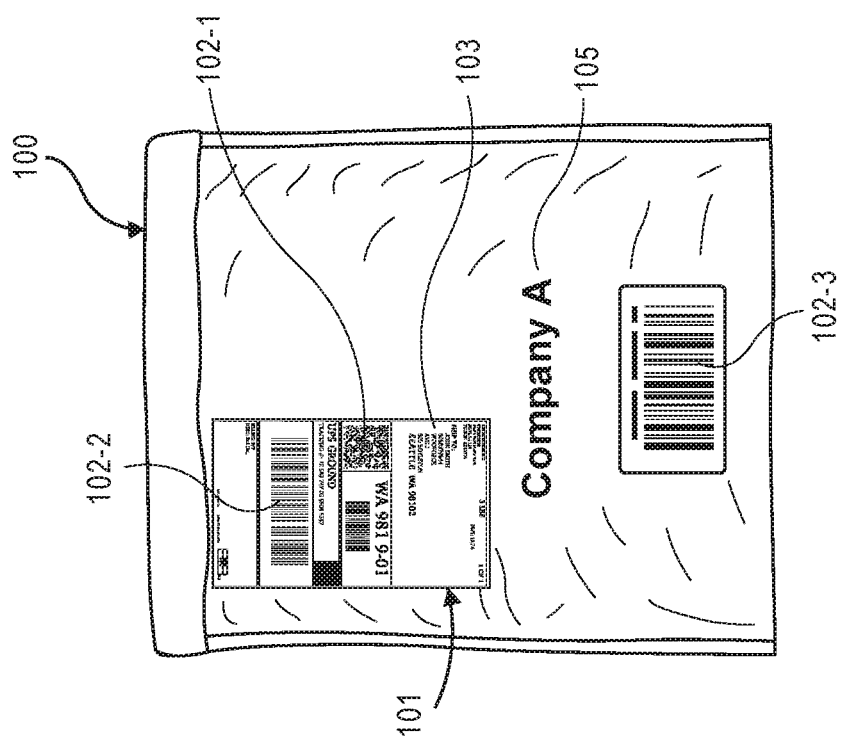

FIGS. 1A through 1D are illustrations of packages with affixed identifiers, in accordance with implementations of the present disclosure. As illustrated, FIG. 1A is an illustration of padded envelope package 100 and FIG. 1B is an illustration of a corrugate box package 120, both of which are utilized by Company A 105/125 to ship an item to a destination indicated by a label 101/121 that is affixed to the package 100/120. As illustrated, the labels 101/121 may include one or more visual identifiers 102/122, such as quick response ("QR") code 102-1/122-1 or barcode 102-2/122-2. Likewise, in some instances, other identifiers, such as a barcode 102-3/122-3 may also be affixed at other locations on the package 100/120 and independent of the label 101/121. The identifiers 102/122 may be used for a variety of purposes and information associated with those identifiers may be maintained in datastores known to Company A and/or other carriers. For example, the barcode 102-2/122-2 may be known to Company A and the carrier and be associated with a delivery destination for the package 100/120, which may be also printed on the package as a human readable delivery destination 103/123. In some instances, other identifiers, such as an RFID tag 122-4 included on package 120 (FIG. 1B) may be included in the package 120 and used in the monitoring, tracking, and/or transport of the package 120.

Regardless of the type and/or size of the package 100/120 one or more identifiers are affixed to the package and used by carriers to facilitate transport of the package to an initial delivery destination associated with the package, as specified by Company A 105/125.

Figure 1D:
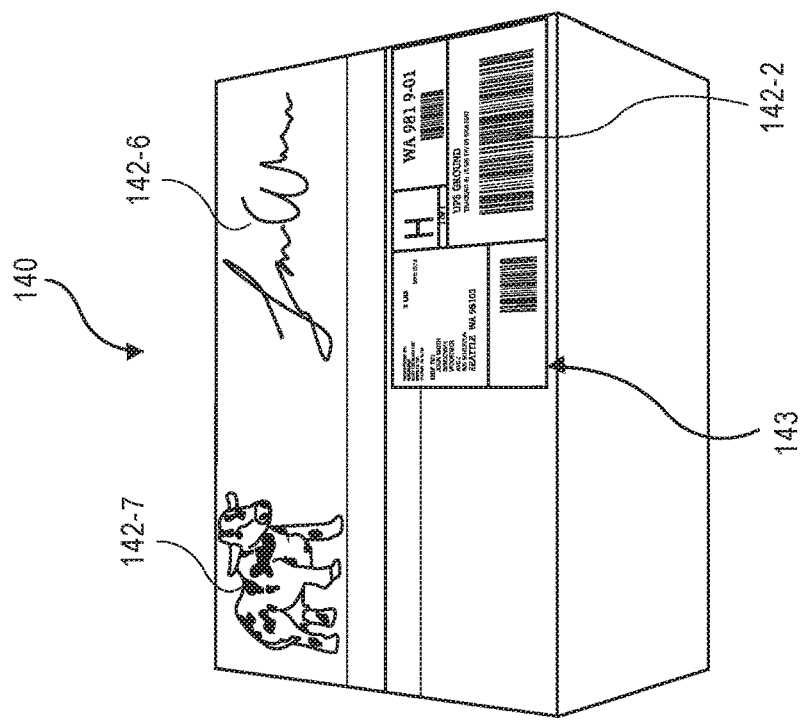
Figure 1C:
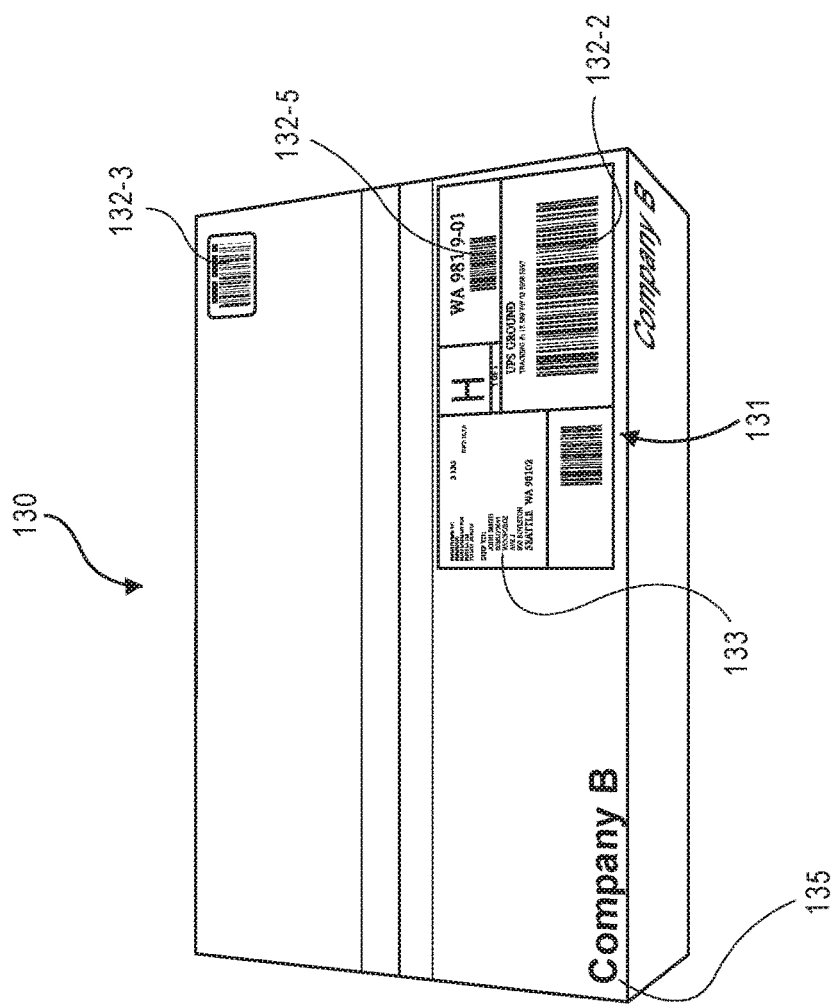

In a similar manner, FIG. 1C is an illustration of a package 130 shipped by Company B 135 to a delivery destination specified by Company B 135. Like the packages discussed above with respect to FIGS. 1A through 1B, the package 130 illustrated in FIG. 1C includes a shipping label 131 that has a human readable delivery destination 133. There are also one or more identifiers, such as barcodes 132-2, 132-3, and 132-5 or other indicia, affixed to the package 130. The identifiers 132 may be associated with any of a variety of information that is used by Company B and/or carriers in the monitoring or transport of the package 130 to the destination 133 specified by Company B.

As discussed further below, any one or more of the identifiers 102/122/132 may be utilized with the disclosed implementations to repurpose a package for shipment of an item to a second destination. For purposes of discussion, the disclosed implementations will be described as being enabled Company A and Company A facilitates the repurposing of packages and use of already affixed identifiers to enable shipment of the repurposed packages to other destination.

A repurposed package may be a package originally sent from Company A, originally sent from Company B, or originally sent by any other company, and the identifiers may be already known or identifiable to Company A or may be previously unknown to Company A. For example, while an identifier 102/122 included on a package 100/120 originally shipped by Company A may be already known to company A, an identifier 132 included on a package originally shipped by Company B may be unknown to Company A. Regardless, any identifier included on any package that becomes a repurposed package may be utilized with the described implementations. In still other examples, any unique identifier included on a repurposed package may be utilized with the described implementations.

For example, FIG. 1D illustrates a package 140 with an affixed shipping label 143 that includes an identifier 142-2 in the form of a barcode. In addition, two other unique identifiers 142-6, 142-7 are affixed to the package. In this example, rather than, or in addition to using visual identifiers included with the label 143, such as identifier 142-2, it may be determined that identifier 142-6 and/or identifier 142-7 are unique, and the first user sending the repurposed package and a second destination of the repurposed package may be associated with one or both of those identifiers 142-6/142-7, and the package 140 repurposed and shipped to the second destination. While this example includes two unique identifiers 142-6, 142-7, in some implementations, the uniqueness may be in an arrangement of identifiers on the repurposed package and not necessarily the uniqueness of the identifiers. For example, a series of dots or stickers may be randomly affixed to the package and the random arrangement may be determined by the described implementations and utilized as the identifier for the package. In such an implementation, the first user (sender) of the repurposed package and the delivery destination for the repurposed package may be associated with the unique arrangement of the stickers affixed to the package.

Regardless of the type and/or configuration of identifiers affixed to a package, the sender or source of the package and the delivery destination may be associated with the identifier(s) that are affixed to the package and the package repurposed and sent to the delivery destination, in accordance with the described implementations.

Figure 1E:
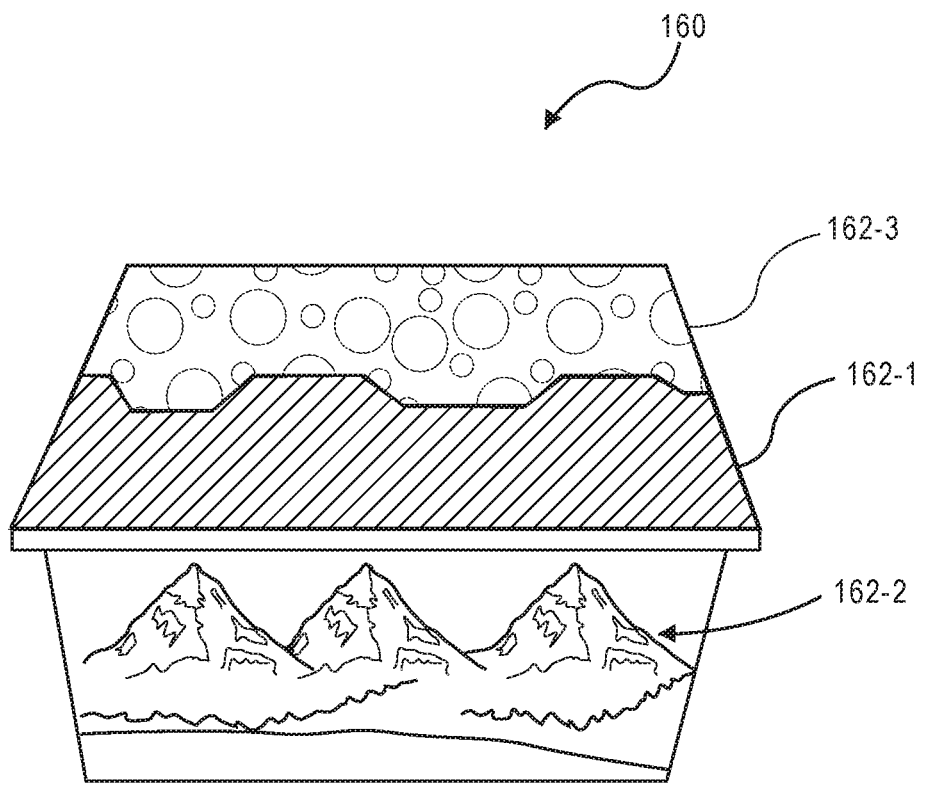

FIG. 1E illustrates another example of a package 160 that includes one or more unique identifiers 162 that may be used to repurpose the package for shipment of an item from the first user to the second user, in accordance with described implementations. In this example, rather than the identifier being included on the package as part of a shipping label, the unique identifier(s) 162 may be part of the package itself. In addition, the package 160 may be formed from a durable material, such as plastic, fiberglass, chipboard, laminated cardboard, etc., so that the package will withstand multiple shipments between users, etc. In this example, the package 160 includes three different unique identifiers 162-1, 162-2, and 162-3, any or all of which are permanently part of the package and each uniquely identifiable. In addition, the package 160 is formed of a plastic material that includes hinged lids to enable/prohibit access to items contained within the package.

As with other packages that are used as repurposed packages, the package 160 may be scanned or imaged, the unique identifier(s) 162 determined, the first user that is sending the repurposed package associated with the identifier(s) 162, and the delivery destination associated with the identifier(s) 162. When a carrier retrieves the repurposed package 160, the identifier(s) 162 that are part of the package are scanned or imaged and information is provided to the carrier to inform the carrier of the delivery destination, and/or other information, associated with the repurposed package.

Utilizing a package similar to the one illustrated in FIG. 1E eliminates the need for any shipping labels, stickers or other identifiers to be included on or in the package, because the package itself is uniquely identifiable. Likewise, because the package is made of a durable material, it will withstand multiple shipments and increase the stability of stacked packages, for example during transport by a carrier vehicle. It will be appreciated that other forms and configurations of packages may be utilized with the disclosed implementations and those discussed with respect to FIGS. 1A through 1E are provided only as examples. For example, a durable package that includes permanent unique identifiers may be configured to be collapsible, so that a user can temporarily store the package until the user is ready to repurpose the package for a shipment. In some implementations, the unique identifiers may not be distinguishable by human vision. For example, an image, such as unique identifier 162-2, may include embedded information, such as watermark that is detectable by scanning or image processing a representation of the package.

In general, a unique identifier may be any representation or detectable information than can be used by the described implementations to uniquely identify a package. In some implementations, an image or arrangement of images on a package that are used as a unique identifier may be detected and associated with a unique series of characters. In such an implementation, those characters may be stored in a data store and associated with the image, the user, destination location, etc. In some implementations, the unique identifier may be a barcode or QR code, or other similar visual identifier. In such an implementation, detectability of the unique identifier, and the repeatability of the detection of the unique identifier is improved, thereby increasing the efficiency and consistency with which a package may be repurposed and utilized with the described implementations.

FIGS. 2A through 2D are illustrations of a user interface of an application executing on a portable device used by a user to repurpose a package for shipment, in accordance with implementations of the present disclosure. As discussed below with respect to FIG. 9, any type of device, such as a smart phone, tablet, camera, laptop, wearable, voice controlled or enabled device, etc., may be utilized with the described implementations. In the described implementation, the user is associated with the user device and/or the application and the identity of the user has already been verified by the user device and/or the application. For example, the user may input a passcode, biometric identification, and/or other information to verify the identity of the user to the device 200 and/or the application executing on the device. In other implementations, the user device and/or application may verify the identity of the user as part of the described implementations.

Utilizing the application executing on the user device, a first user may scan and/or capture an image of a package to be used as a repurposed package. Referring first to FIG. 2A, a user interface 201 is presented to the user that enables the user to scan 206 or repurpose a package. In this example, the user is scanning an image of a package 208 in which an item was previously shipped to a location indicated on the already affixed shipping label 211. In this example, the item was shipped by Company A 205, as indicated on the package.

Upon scanning or imaging the package 208, an image of the package is processed using one or more image processing algorithms to detect one or more identifiers already affixed to the package. Scanning or processing of the image may be performed locally on the device 200, the image may be sent to one or more remote computing resources for processing, or an initial processing of the image may be performed by the device 200 and a subsequent additional processing performed by the remote computing resources. For example, an initial image processing may be performed locally on the device 200 to detect a unique identifier, such as the QR code 212-1 or the barcode 212-2, those portions of the image extracted and only those portions of the image transmitted by the device 200 to the remote computing resources, thereby reducing the total amount of data transmitted by the device 200. The remote computing resources may then further process the received portion of the image to, for example, determine a code or uniqueness of the identifier. For example, the barcode or QR code may represent a unique series of numbers, characters, or symbols that may be maintained in a data store and associated with other information, such as source or destination address, package type, package size, or other information.

In this example, the application executing on the user device 200 and the processing is performed by a system under control or in communication with Company A and Company A is able to determine from a processing of the identifier 212 already affixed to the package 211 a size and/or type of the package, as illustrated by package information 222 illustrated in the user interface 221 of FIG. 2B. In addition to identifying the size and/or type of the package, in some implementations, it may also be confirmed, upon detection of the identifier affixed to the package, that a prior shipment associated with the package and affixed identifier has been completed. For example, if Company A was the original shipper of the package, it may receive an indication from a carrier that delivered the package confirming that delivery of the package has been completed.

In examples where the package or identifier are not already known to Company A, the user may provide package type and/or dimension information via the application executing the device 200. In other implementations, additional image processing may be performed to determine approximate dimensions and/or type of the package. For example, image processing may be performed to determine the size and dimensions of the shipping label affixed to the package, the wording on the shipping label, etc., and, based on that information determine a relationship and relative size of the package to which the shipping label is already affixed. In some implementations, image meta data indicating depth information, focal length of a lens used to capture the image, aperture, etc., may also be used to determine the approximate dimensions of the package.

Upon determining the package and detecting one or more identifiers already affixed to the package, a first user identifier corresponding to the first user is automatically associated with the identifier that is already affixed to the package as the user that is repurposing the package (i.e., the sender of the repurposed package). In addition, as discussed further below, a location, such as the first user's current location, may be associated with the identifier already affixed to the package as the source location from which the repurposed package is to be retrieved by a carrier.

In addition to associating the first user identifier and/or the location with the identifier already affixed to the package, the user interface 221 presented on the device 220 requests that the first user select a delivery destination 226 to which the repurposed package is to be shipped. In this example, the first user is associated with the application executing on the device 220 and a user profile is maintained by Company A that includes delivery destinations previously used by the first user or provided by the first user. Accordingly, those delivery destinations are presented to the user for selection, in this example as potential delivery destinations 226-1, 226-2, 226-3, and 226-4. The first user may select one of the potential delivery destinations as the delivery destination or provide another destination by selection of the "Provide Other" control 227.

When the first user selects or provides a delivery destination, the selected delivery destination is associated with the identifier 212 that is already affixed to the package 208 as the delivery destination for the repurposed package. The associations between the identifier already affixed to the repurposed package, the delivery destination, and the indication of the first user or a source location associated with the first user are maintained in a datastore by Company A and used to facilitate shipment of the repurposed package from the source location to the delivery destination.

Referring now to FIG. 2C, in some implementations, the user may provide an image 238 or otherwise indicate the item(s) that will be included in the repurposed package. In this example, the user interface 231 of the application executing on the device 230 has presented a request 232 that the first user identify the item they are shipping in the repurposed package to the delivery destination. The first user, in response, has used the device 230 to generate an image 238 of the item. The image 238 may be processed using one or more image processing techniques to identify the item. If the item is identified, the identity 236 of the item may be presented to the user via the user interface 231 and the first user may either edit or confirm the item identity by selecting either the edit control 228 or the confirm control 233.

In some implementations, Company A may maintain information for a plurality of items and if the item is identified, information may be queried to determine an approximate size and/or weight of the item. Alternatively, in some implementations, the user may provide via the user interface 231 of the application executing on the device 230 an approximate weight and/or size of the item. As discussed further below, the size and/or weight of the item may be used to determine a shipping cost for the item. In addition, in some implementations, item identification may be used to ensure that restricted items (e.g., hazardous, flammable, illegal) items are not shipped by the first user to the delivery destination using the repurposed package.

In other implementations, based on the package dimensions, it may be confirmed that the repurposed package can be used to ship an item to the delivery destination and a flat fee, or no fee, may be charged for the shipment of the item. For example, the first user may subscribe to a service, be a member, or have another relationship with Company A and that relationship may include shipment of items in repurposed packages on behalf of the user for no additional fee.

Referring now to FIG. 2D, upon identification of the item, or if item identification is not necessary, the user interface 241 presents confirmation information 242 to the first user that the repurposed package is now ready for shipment and provides retrieval information 246 indicating when and where the package will be retrieved. In this example, the retrieval information indicates that a carrier will pick up the repurposed package from the first user's house by 3:00 pm on the same day. In addition, fee information 244 indicating a cost to the first user to ship the repurposed package is presented along with delivery information 247 indicating when the repurposed package will be delivered to the delivery destination. In this example, there is no fee and the user interface indicates that the repurposed package will be delivered to the delivery destination by tomorrow. The first user may confirm the shipment, by selecting the "Confirm" control 250, select a different source location from which the repurposed package will be retrieved to initiate the shipment, by selecting the "Select a Different Location" 248 control, and/or select a different delivery timeframe, by select the control 247. In addition, in some implementations, the user may be provided an option to obtain or purchase insurance for delivery of the item in the repurposed package.

As discussed further below, any of a variety of source locations may be selected from which the repurposed package will be retrieved from the first user. For example, the source location may be the user's home and, in accordance with the disclosed implementations, a carrier may be instructed to travel to the first user's home and retrieve the repurposed package. In some implementations, it may be determined that a carrier is already planned to travel to the first user's home (e.g., to deliver another package) and the instructions may indicate that, while the carrier is at the first user's home the carrier is to retrieve the repurposed package, thereby initiating shipment of the repurposed package to the specified delivery destination.

In other implementations, the first user may select to leave the package at another location, such as an office location, mailroom, locker facility, vehicle trunk, etc., and the carrier will be instructed to retrieve the package from that specified source location. In some implementations, the first user may also provide additional retrieval information or instructions. For example, the first user may be able to leave the repurposed package inside their house, a secure locker, vehicle trunk, etc., so that the repurposed package remains secure until the it is retrieved by the carrier. In such an example, the first user may provide access information necessary for a carrier to access the secure area and retrieve the repurposed package. In other implementations, the first user may already have an established relationship with the system such that the system already has the information necessary to enable a carrier to access the secure location and retrieve the repurposed package.

In still other examples, the source location may be a dynamic location, such as the first user's current location and the carrier will navigate to that dynamic location and retrieve the repurposed package. For example, the first user may specify the source location as the current location of the first user (a dynamic location) and the application executing on the user device 240 may periodically provide position information, such as global positioning system ("GPS") data indicating the current location of the device 240 as representative of the current position of the first user. In such an example, the carrier may be periodically provided with the position information and navigate to the current position if the first user and retrieve the repurposed package.

In a similar manner, any destination may by indicated as the delivery destination. For example, the first user may specify a delivery destination as a stationary location (e.g., address), or as a dynamic location. Like the source location, the delivery destination may be a home address, business address, or other stationary location, or a dynamic location, such as the current location of a second user. For example, and referring back to FIG. 2B, the first user may select to have the repurposed package delivered to the current location of a second user, such as James Stevens 226-3. In such an example, current location information of the second user may be determined or provided by a device associated with the second user and that current location information may be utilized as the delivery destination. In such an example, the carrier delivering the repurposed package to the delivery destination may receive changes in the delivery destination as the second user moves and navigate to the specific location of the second user to deliver the repurposed package. For example, final delivery of the repurposed package to the delivery destination may be done using an unmanned aerial vehicle ("UAV"). In such an example, the UAV may periodically receive position information representative of the delivery destination and adjust the navigation route of the UAV to deliver the repurposed package to the second user at the delivery destination. In still other examples, as discussed further below with respect to FIG. 8, a notification may be sent to the second user and the second user may select the delivery destination and/or alter the delivery destination to a second delivery destination.

Figure 3A:
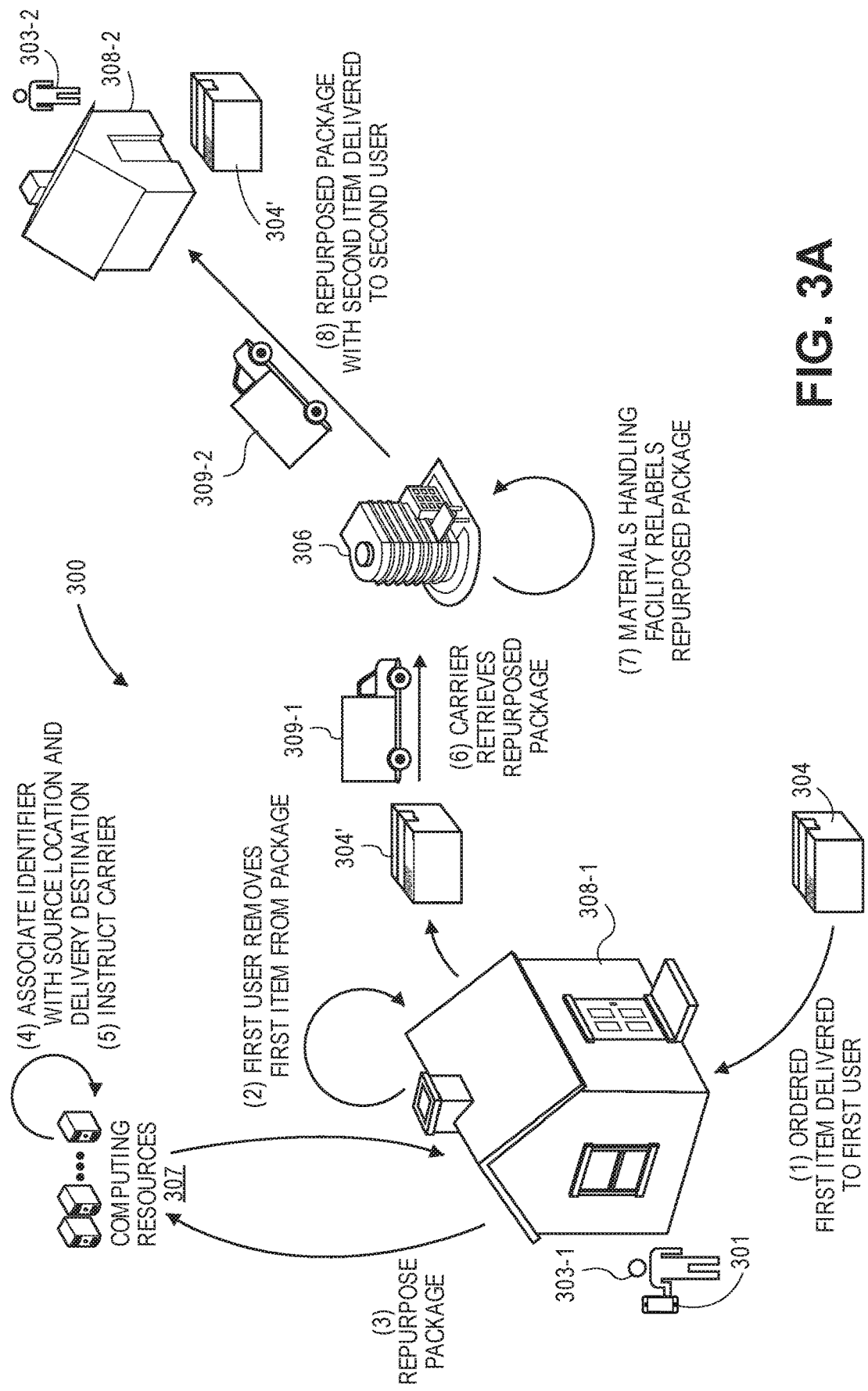
FIGS. 3A through 3B are transition diagrams illustrating examples of delivery of a first item being delivered to a first user, and the first user repurposing the package and original label on the package to ship a second item to a second user, in accordance with implementations of the present disclosure.
Figure 3B:
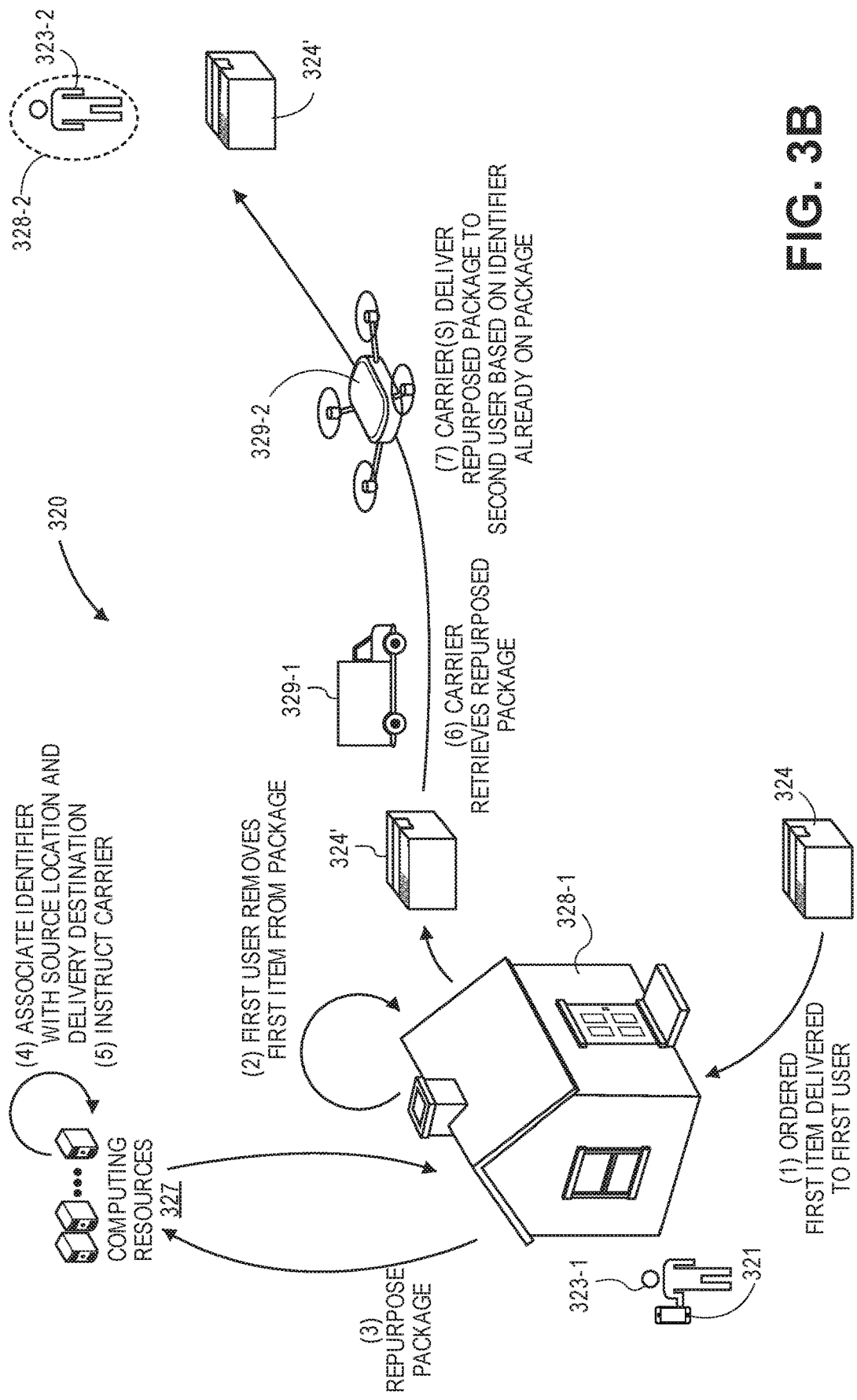

FIGS. 3A through 3B are transition diagrams 300/320 illustrating examples of delivery of a first item in a package 304 to a first user 303-1 and the first user 303-1 repurposing the package and an identifier already affixed to the package, collectively a repurposed package 304', to ship a second item to a second user 303-2, in accordance with implementations of the present disclosure. The first user 303-1 may order an item, for example, from an e-commerce website, and the item may be shipped to the first user in a package 304. As part of the shipment, a label with shipping information corresponding to a destination specified by the first user, such as the first user's home, is affixed to the package and utilized by the sender of the package and/or carriers that deliver the package, track the package and/or ship the package.

After the first user has received the package 304, the first user removes the first item from the package and, rather than recycling or discarding the package, repurposes the package for shipment of a second item to a second user 303-2. In accordance with the disclosed implementations, the first user scans or images the package 304 with a device 301 associated with the user that communicates with a remote compute resource 307 to determine an identifier on the package. The identifier may be the shipping label, or a portion thereof, or another aspect of the package that is uniquely identifiable. For example, a barcode, QR code, etc., may be affixed to the package as part of the initial shipment and identified for use as the identifier already affixed to the package for purposes of the repurposed package and the disclosed implementations. In other examples, as discussed above, the identifier may be an active tag included on or in the package, an arrangement of visual markings on the package, and/or a combination of identifiers that can be used to uniquely identify the package as a repurposed package.

As part of the repurposing of the package, through interaction with the device or an application executing on the device, the first user provides or selects a source location from which the package will be retrieved, and a delivery destination 308-2 for delivery of the repurposed package. The user identifier known to the application and/or the device, the source location, and the delivery destination are transmitted from the device 301 to the remote computing resources 307 and the remote computing resources 307 associate the first user, the source location, the repurposed package, and the delivery destination 308-2 with the determined identifier for the repurposed package 304'. In some implementations, as discussed above, an item included in the repurposed package and/or a delivery timeframe may also be associated with the identifier.

The remote computing resources also determine a carrier 309-1 that is to retrieve the repurposed package from the source location 308-1, such as the first user's home, and sends instructions to the carrier 309-1 to retrieve the repurposed package. In this example, the instructions also instruct the carrier 309-1 to transport the repurposed package to a materials handling facility 306. In addition, in some implementations, the remote computing resources 307 may also send a notification to the second user 303-2 informing the second user of the repurposed package, the delivery destination 308-2 to which the repurposed package will be delivered, and the delivery timeframe indicating by when the repurposed package will be delivered.

The carrier 309-1, as discussed further below, may be a carrier that is determined to be within a defined distance of the source location 308-1, a carrier that is scheduled to deliver a different item to the source location 308-1 and/or to a location that is within a defined distance of the source location 308-1, a carrier that is available to take on work and retrieve the repurposed package from the source location, etc.

Upon sending instructions to the carrier 309-1, the carrier retrieves the repurposed package 304' from the source location 308-1 and transports the repurposed package 304' to a materials handling facility 306. At the materials handling facility 306, the repurposed package 304' is scanned and the identifier detected. Upon detection of the identifier, a second shipping label that indicates the delivery destination 308-2 for the repurposed package is printed and affixed to the repurposed package. In some implementations, this may be an automated process that utilizes existing systems in the materials handling facility to scan, print and affix the label to the repurposed package.

Finally, the repurposed package 304' may be transported through any transportation channels and/or using any carriers 309-2 to complete delivery of the repurposed package to the delivery destination 308-2. For example, the repurposed package 304' may be injected into other shipping channels and shipped along with other packages that are destined for the delivery destination 308-2 and/or locations near the delivery destination.

FIG. 3B illustrates a transition diagram 320 illustrating another example of delivery of a first item in a package 324 to a first user 323-1 and the first user 323-1 repurposing the package and an identifier already affixed to the package, collectively a repurposed package 324', to ship a second item to a second user 323-2, in accordance with implementations of the present disclosure. The first user 323-1 may order an item, for example, from an e-commerce website and the item may be shipped to the first user in a package 324. As part of the shipment, a label with shipping information corresponding to a destination specified by the first user, such as the first user's home, is affixed to the package and utilized by the sender of the package and/or carriers that deliver the package to track and/or ship the package.

After the first user has received the package 324, the first user removes the first item from the package and, rather than recycling or discarding the package, repurposes the package for shipment of a second item to a second user 323-2. In accordance with the disclosed implementations, the first user scans or images the package 324 with a device 321 that communicates with a remote compute resource 327 to determine an identifier on the package. The identifier may be the shipping label, or a portion thereof, or another aspect of the package. For example, a barcode, QR code, etc., may be affixed to the package as part of the initial shipment and identified for use as the identifier already affixed to the package for purposes of the repurposed package and the disclosed implementations. In other examples, as discussed above, the identifier may be an active tag included on or in the package, an arrangement of visual markings on the package, and/or a combination of identifiers that can be used to uniquely identify the package as a repurposed package.

As part of the repurposing of the package, through interaction with the device or an application executing on the device, the first user provides or selects a source location from which the package will be retrieved, and a delivery destination 328-2 for delivery of the repurposed package. The user identifier known to the application and/or the device, the source location, and the delivery destination are transmitted from the device to the remote computing resources 327 and the remote computing resources 327 associate the first user, the source location, the repurposed package 324', and the delivery destination 328-2 with the determined identifier for the repurposed package 324'. In some implementations, as discussed above, an item included in the repurposed package and/or a delivery timeframe may also be associated with the identifier. In addition, in some implementations, the remote computing resources 327 may also send a notification to the second user 323-2 informing the second user of the repurposed package, the delivery destination 328-2 to which the repurposed package will be delivered, and the delivery timeframe indicating by when the repurposed package will be delivered.

In this example, the delivery destination 328-2 is a dynamic delivery destination in that it may change up until the delivery. Specifically, in this example, the delivery destination 328-2 is specified as the current location of the second user 323-2. In such an example, a device associated with the second user 323-2 periodically provides position information (e.g., GPS data) indicative of the current location of the user and that position information is utilized as the delivery destination. If the user moves, the delivery destination will be updated with new position information and provided to the carrier, so that the repurposed package is routed directly to the current location of the second user 323-2. Alternatively, as discussed below, the second user 328-2 may provide a response to the computing resources 327 altering the delivery destination. For example, the second user may provide a response requesting that the repurposed package 324' be delivered to a different location (second delivery destination), such as the home of the second user. In such an example, the delivery destination of the repurposed package 324' associated with the identifier affixed to the repurposed package is updated to the second delivery destination and the route of the repurposed package is altered to cause delivery of the repurposed package to the second delivery destination.

The remote computing resources also determine a carrier 329-1 that is to retrieve the repurposed package from a source location 328-1 and sends instructions to the carrier to retrieve the repurposed package from the source location 328-1. In comparison to FIG. 3A, the repurposed package 324' is delivered by one or more carriers from the source location 328-1 to the delivery destination 328-2 using the label that was originally affixed to the package before it was repurposed. In such an example, when the identifier included on the repurposed package is scanned by a carrier, the delivery destination 328-2 for the repurposed package is provided. Alternatively, or in addition thereto, interim locations along the transportation route may also be presented in response to a scan of the identifier already included on the repurposed package. Interim locations may include locations or transfer points where a first carrier, such as first carrier 329-1 is to retrieve or deliver the repurposed package. For example, a first interim location may be assigned to the first carrier 329-1 as a delivery location of the repurposed package after retrieving the repurposed package from the source location 328-1. Likewise, the same interim location may be provided to a second carrier 329-2, in this example a UAV, instructing the UAV to retrieve the repurposed package from the interim location.

At each stage of routing, the carrier(s) 329 utilize the identifier already included on the repurposed package to determine the next interim location or delivery destination to which the carrier is to transport the package. Specifically, as discussed, upon scanning the identifier, the remote computing resources provide an interim destination or delivery destination to the carrier as instructions to where the repurposed package is to be delivered by that carrier. Through use of the identifier, the delivery destination for the repurposed package can be dynamically updated at any point during delivery of the repurposed package by updating information maintained in the data store that is associated with the identifier affixed to the package. For example, if the second user 323-2 alters the delivery destination to a second delivery destination, the delivery destination associated with the identifier is updated in the data store of the computing resources 327 to reflect the second delivery destination as the delivery destination for the repurposed package. When a carrier or other entity scans the identifier, the second delivery destination, or an interim destination, are provided in response.

The repurposed package may be transported through any transportation channels by the carriers and is ultimately delivered to the delivery destination 328-2. In this example, because the delivery destination is dynamic, and the final delivery is performed by a UAV 329-2, after the UAV retrieves the repurposed package from an interim location along the transportation route, the remote computing resources 327 periodically provide to the UAV position information representative of the current position of the second user 323-2, which in this example is the delivery destination. If the current position of the second user changes, the navigation of the UAV is updated so that the UAV navigates to and completes delivery of the repurposed package to the current location of the second user 323-2.

Figure 4:
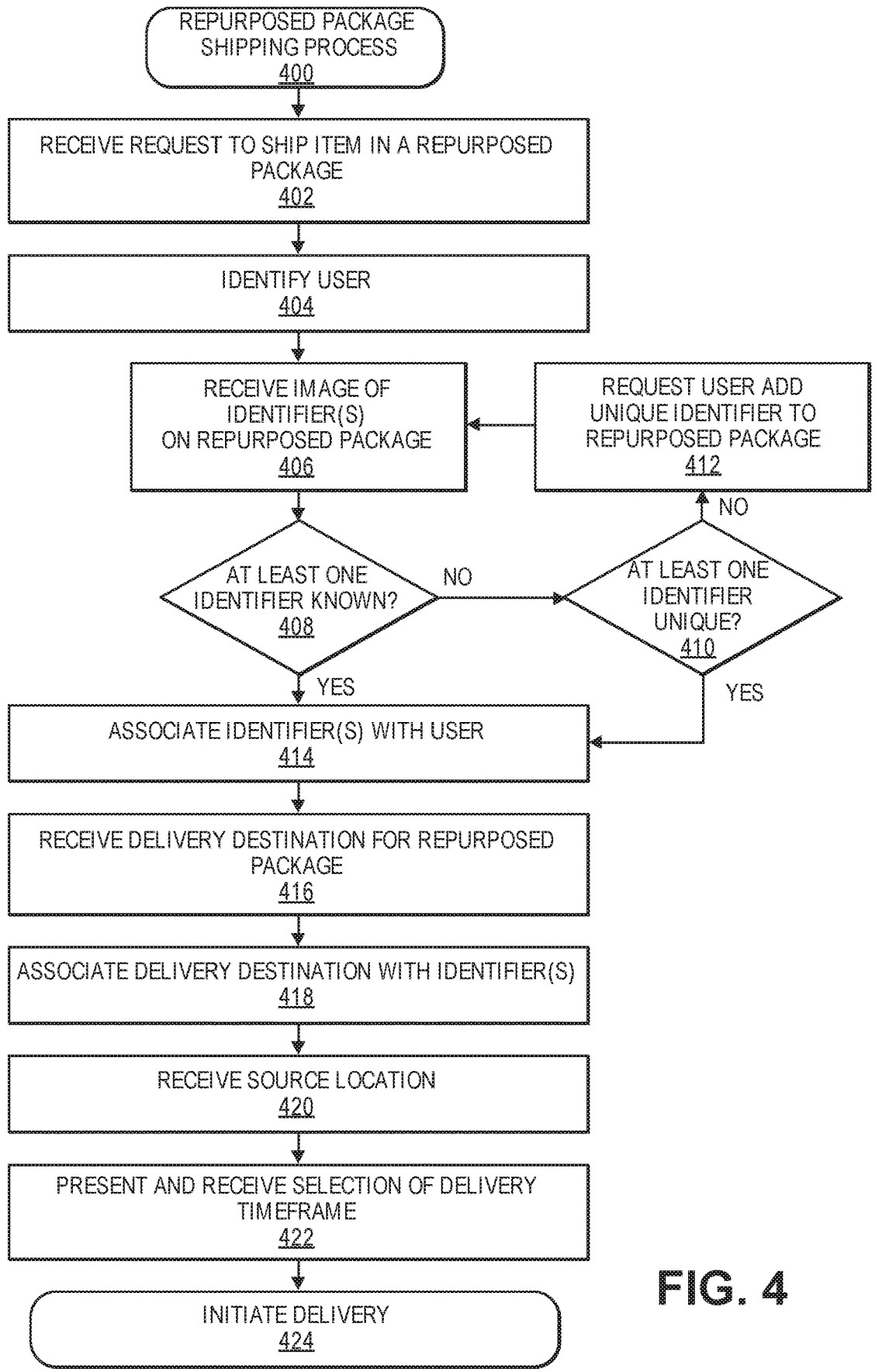
FIG. 4 is a flow diagram of an example repurposed package shipping process, in accordance with implementations of the present disclosure.

FIG. 4 is a flow diagram of an example repurposed package shipping process 400, in accordance with implementations of the present disclosure. The example process 400 beings upon receipt of a request to ship an item in a repurposed package, as in 402. As discussed above, a first user may utilize an application executing on a device, such as a smart phone to initiate a request to ship an item in a repurposed package.

Upon receipt of the request, the identity of the first user that submitted the request is determined, as in 404. In one implementation, the first user may have previously been identified by the application executing on the user device and that first user identity may be provided to the example process 400 as part of the request to ship an item in a repurposed package. For example, when the first user initiates the application on the user device, the first user may be requested to provide an authentication, such as a user name and password, biometric information, facial recognition, voice recognition, etc., that is used by the user device and/or the application executing on the device to determine an identity of the first user. In other implementations, user authentication may be obtained when the first user submits the request to repurpose a package for shipment.

In addition to determining an identity of the first user, an image of the package to be repurposed, or an image of an identifier already affixed to the package to be repurposed, is received, as in 406. For example, the user may utilize a camera included on the device on which the application is executing to scan or image the package. The image may then be processed to determine an identifier, or a plurality of identifiers included on the package. In another implementation, an antenna or other receiver of the device may be utilized to detect an active identifier included on the package. For example, BLUETOOTH®, Near Field Communication ("NFC"), RFID, and/or other forms of wireless communication may be utilized to detect an active identifier that is already included on the package to be repurposed.

Upon detection of the identifier(s) already included on the package, a determination is made as to whether at least one of the identifiers are already known and/or maintained in a datastore accessible to the example process, as in 408. For example, if the package was originally shipped by a company that is performing or associated with the example process 400, the identifier(s) included on the package may have been added to the package by that company and the company may maintain in a datastore information corresponding to the identifier.

If it is determined that none identifiers are known, a determination is made as to whether at least one of the identifiers are considered unique, as in 410. An identifier may be considered unique, for example, if it is and/or represents a series of characters or a representation of a series of characters that is not included in a datastore accessible by the example process 400. In another example, an identifier may be considered unique if it is an arrangement or configuration of visual markings that are not included in a datastore accessible by the example process 400.

If it is determined that there are no unique identifiers already included on the package, or there are no identifiers on the package, a request may be presented to the first user that unique identifier be added to the package, as in 412. As discussed above, the unique identifier can be anything that is uniquely identifiable and need not be a shipping label, etc. For example, referring back to FIG. 1D, the first user may sign or scribble markings on the package for use as an identifier 142-6 or affix a sticker as an identifier 142-7. Additionally, as discussed above, in some implementations, the uniqueness may be in the positioning or placement of a plurality of identifiers that are affixed to the package and need not necessarily be a specific unique identifier.

If it is determined that at least one of the identifiers are unique, or after the first user adds a unique identifier, the identifier is associated with the first user, as in 414. Association of the first user with the identifier may include updating a datastore that maintains an association between the identifier and the user information, such as a user profile of the first user.

The example process 400 also receives, for example from an application executing on a device in use by the first user, a delivery destination for the repurposed package, as in 416. As discussed above, the delivery destination may be a specific fixed location, such as a home or business address, or a dynamic location, such as the current location of a second user that is to receive the repurposed package. Like the user information, the delivery destination is also associated with the identifier, as in 418. For example, the data store that includes the identifier information may be updated to indicate the delivery destination specified by the first user and whether that delivery destination is a fixed location or a dynamic delivery destination that may change, as discussed herein.

In addition to associating the first user that is sending the repurposed package and the delivery destination with the identifier already included on the repurposed package, a source location from which the repurposed package is to be retrieved is determined or received, as in 420. In some implementations, the source location may be a current location of the first user, as determined by positioning information received from a device in use and/or associated with the first user, a location specified by or received from the first user, such as a locker or other physical location, a current location of the first user (i.e., a dynamic location), a secure location, etc.

In some implementations, based on the source location and delivery destination, one or more delivery timeframes may be determined, presented to the first user for selection, and a selection of a delivery timeframe received, as in 422. For example, as discussed further below with respect to FIG. 7, one or more delivery routes using one or more carriers from the source location to the delivery destination may be determined, along with the different costs associated with those routes/carriers and the delivery time by which the repurposed package can be delivered to the delivery destination. Based on those determined delivery routes and costs, one or more delivery timeframe options and/or costs may be presented to the first user for selection. In some implementations, rather than presenting all different delivery timeframes, in some implementations, the different options may be normalized and only a select group or set of delivery timeframes and costs may be presented to the first user, thereby simplifying user selection. For example, a standard delivery timeframe that requires a standard or no addition cost by the first user, a first delivery timeframe that requires a first additional cost by the first user but results in delivery that is faster than the standard delivery timeframe, and second delivery timeframe that requires a second addition cost by the first user that is greater than the first additional cost but results in a delivery that is faster than the first delivery timeframe, may each be presented to the first user for selection.

Based on the selected delivery timeframe and determined source location and delivery destination, a shipping route is planned for shipment of the repurposed package from the source location to the delivery destination and delivery of the repurposed package is initiated, as in 424. Additional details for shipping and route planning for a repurposed package are discussed further below with respect to FIGS. 6 and 7.

Figure 5:
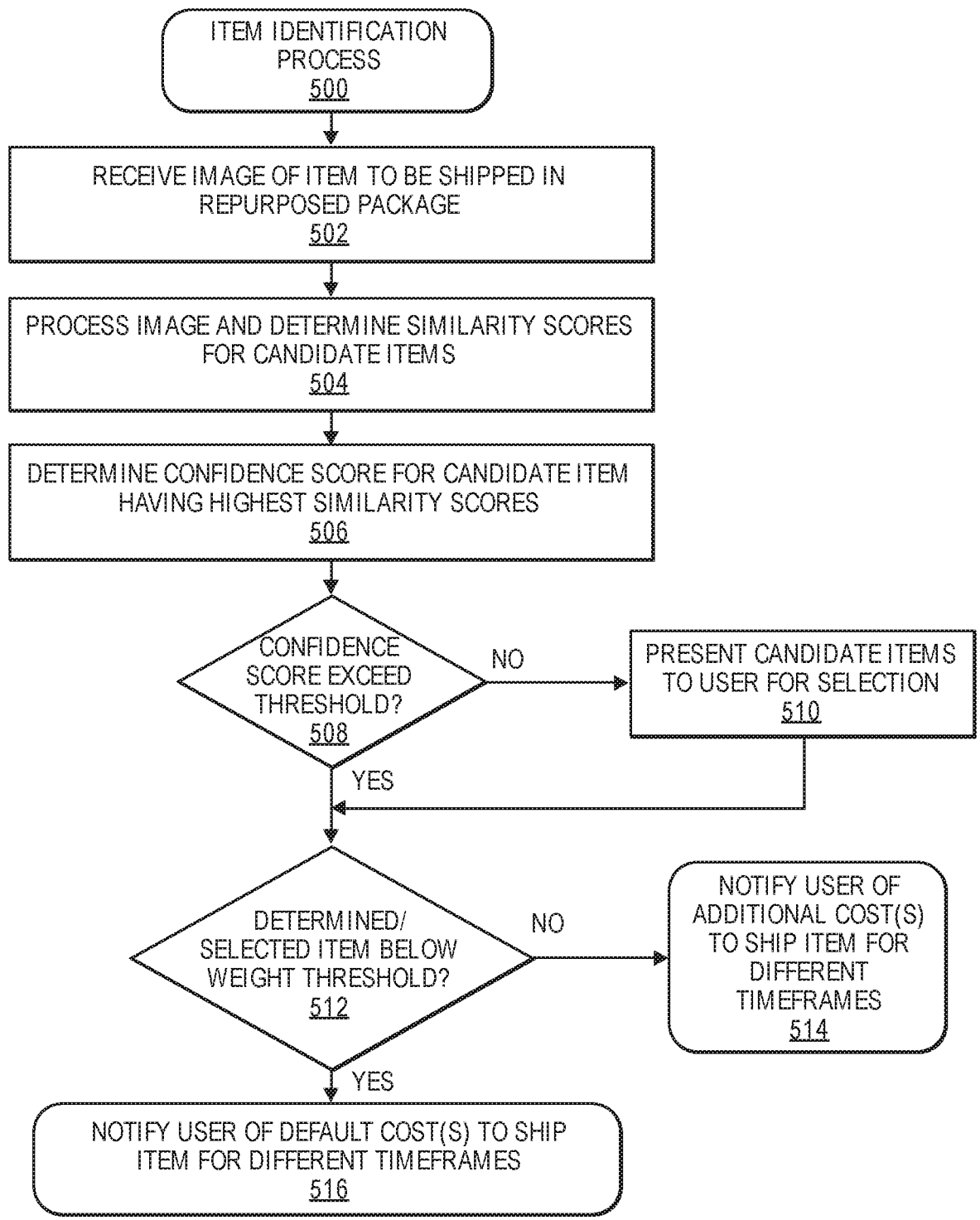
FIG. 5 is a flow diagram of an example item identification process, in accordance with implementations of the present disclosure.

FIG. 5 is a flow diagram of an example item identification process 500, in accordance with implementations of the present disclosure. The example process 500 begins by receiving an image of the item(s) to be shipped within the repurposed package, as in 502. For example, as the user interacts with the application executing on a device associated with the user to schedule shipment of a repurposed package, the user may utilize a camera of the device to generate an image of the item to be placed within the repurposed package for shipment.

Upon receiving the image, the image is processed using one or more image processing algorithms to determine one or more candidate items and similarity scores for those candidate items, as in 504. For example, an object detection algorithm or other image processing algorithm may detect the item represented in the image, generate one or more item feature vectors representative of the item, and compare those item feature vectors with stored feature vectors representative of known items For each comparison, a similarity score may be determined that is indicative of a similarity between the item feature vector and the stored feature vector.

Any object recognition algorithm, such as local Scale-Invariant Feature Transform ("SIFT"), Speeded-Up Robust Features ("SURF"), Binary Robust Independent Elementary Features ("BRIEF"), Oriented Fast and Rotated Brief ("ORB"), Laplacian of Gaussians ("LoG"), Difference of Gaussian ("DoG"), or any robust point-feature extraction technique, may be utilized with the described implementations. In addition, or as an alternative thereto, the item feature vector and/or the stored feature vector may be based on regional pixel descriptors such as those extracted by Hessian Affine Region or Harris Affine region detectors. As discussed herein, the algorithms utilized to determine candidate items and similarity scores may operate locally on the device, on remote computing resources, or be distributed between a local device and remote computing resources.

Based on the determined similarity scores, a confidence score is generated for the candidate item having the highest similarity score, as in 506. The confidence score may be determined based on the degree of difference between the similarity scores. For example, if the three highest similarity scores are 98%, 34%, and 30%, a high confidence score is generated indicating that there is a high confidence that the candidate item with the highest similarity score matches the candidate item represented in the image. In comparison, if the highest similarity scores are 88%, 87%, and 86%, a low confidence score will be determined because there is low confidence as to which of the three candidate items are represented in the image.

A determination is then made as to whether the confidence score exceeds a threshold, as in 508. The threshold may be any defined value and may be different for different items, different candidate items, different users, etc. Likewise, in some implementations, a minimum similarity score may likewise be required. If it is determined that the confidence score does not exceed the threshold, the highest ranked candidate items are presented to the user for selection, as in 510. The user may then select or indicate which candidate item matches the item to be included in the repurposed package and/or identify a different item as the item to be included in the repurposed package.

Upon receiving a confirmation from the user as to the candidate item, or if it is determined that the candidate item has been identified with a high enough degree of confidence, a determination is made as to whether the item is below a weight threshold, as in 512. The weight threshold may be any defined value and may vary based on, for example, the carriers that may transport the package, the distance of transport, the time of year, the user, etc.

In some implementations, an item data store may be queried to determine an approximate size and/or weight of the item. In other implementations, the user may provide an approximate size and/or weight of the item. For example, if a delivery route includes the use of a UAV, there may be a maximum weight to flight distance ratio that cannot be exceeded for the UAV. If the determined weight for the item exceeds the maximum weight and the distance the UAV is to transport the item along the route exceeds the flight distance, the route may have to be reconfigured to utilize a different UAV, multiple UAVs in series, or a different mode of transportation or carrier.

If it is determined that the weight of the item exceeds the threshold, the user may be notified of an addition cost or fee to ship the item for one or more of the different timeframes, if more than one delivery timeframe is provided, as in 514. In other examples, the user may be notified that the item is not eligible for shipment using a repurposed package.

If it is determined that the determined approximate weight of the item does not exceed the weight threshold, the user may be notified of the default costs to ship the item in the repurposed package for different timeframes, as in 516. As discussed above with respect to FIG. 4, one or more routes and carrier combinations may be determined based on the source location and delivery destination and different delivery timeframes and costs determined for those route and carrier combinations.

Figure 6:
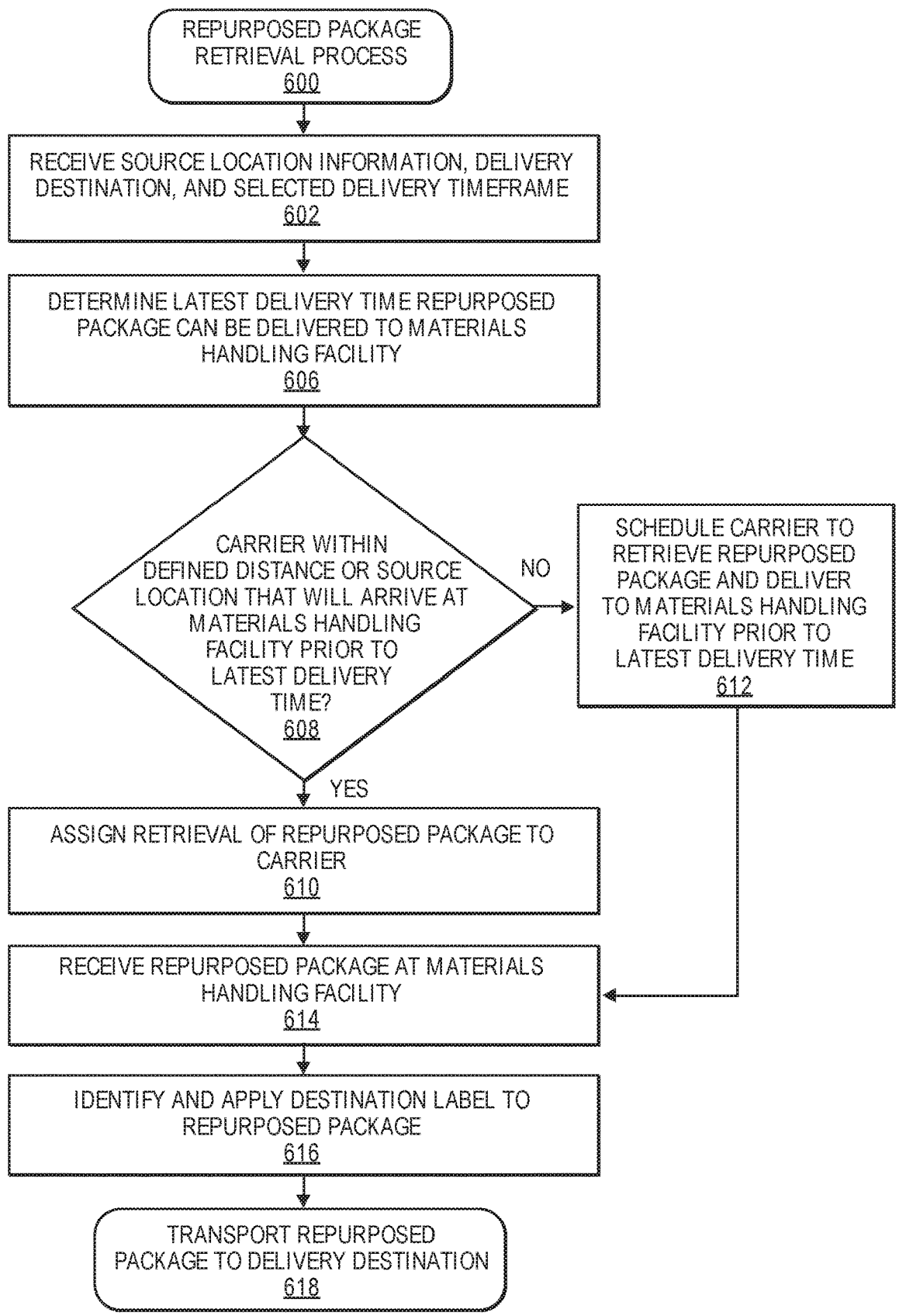
FIG. 6 is a flow diagram of an example repurposed package retrieval and shipment process, in accordance with implementations of the present disclosure.

FIG. 6 is a flow diagram of an example repurposed package retrieval and shipment process 600, in accordance with implementations of the present disclosure. The example process 600 begins by receiving or determining the source location from which the repurposed package is to be retrieved, the delivery destination, and the selected delivery timeframe, as in 602. The source location and delivery destination may be any locations specified by the user that is sending the repurposed package. For example, the source location may be the sending user's home, the current location of the sending user, a business address, a locker, etc. Likewise, the delivery destination may be the recipients home, business address, the current location of the recipient, etc. The delivery timeframe may be the time by which the repurposed package is to be delivered to the delivery destination.

Based on the source location, delivery destination, and/or the delivery timeframe, the latest time by which the repurposed package can be delivered to a materials handling facility at which the repurposed package is to be received and relabeled is determined, as in 606. For example, based on the route determined for the repurposed package, a departure time of a carrier leaving the materials handling facility that is to transport the item may be determined. The latest time the repurposed package can be delivered to the materials handling facility can be calculated as the planned departure time of the carrier plus any time required to receive the repurposed package, scan the identifier already included on the package, print and affix a second label to the repurposed package, and load the package onto the carrier vehicle. For example, if the carrier vehicle is scheduled to depart the materials handling facility at 17:45 and it takes twenty minutes to receive, identify, label and load the repurposed package, the latest time the repurposed package can be delivered to the materials handling facility is 17:25.

Based on the determined latest time the repurposed package can be delivered to the materials handling facility, a determination is made as to whether there is a carrier that is within a defined distance of the source location that is scheduled to arrive at the materials handling facility prior to the latest delivery time, as in 608. The defined distance may be any defined distance and may vary based on, for example, the distance to the materials handling facility, the time until the latest delivery time, traffic, expected traffic, time of day, etc. The location or position of carriers may be monitored as they deliver and/or retrieve items from various locations. As such, the current or planned position of one or more carrier vehicles with respect to the source location can be determined on a real time or near real time basis, thereby allowing the system to determine potential shipping routes and carrier combinations, and corresponding costing information, as the user is repurposing the package for shipment.

If it is determined that there are no carriers within a defined distance of the source location that are scheduled to arrive at the materials handling facility prior to the latest delivery time, a carrier may be specifically scheduled to retrieve the repurposed package from the source location and deliver the repurposed package to the materials handling facility prior to the latest delivery time, as in 612.

However, if it is determined that a carrier is or will be within a defined distance of the source location that is also scheduled to arrive at the materials handling facility prior to the latest delivery time, retrieval of the repurposed package may be assigned to that carrier, as in 610. In some implementations, prior to assignment of the retrieval to the carrier, it may further be determined or confirmed that the additional task of retrieving the repurposed package from the source location will not delay the carrier from arriving at the materials handling facility prior to the latest delivery time.

At some time subsequent to assigning retrieval of the repurposed package from the source location to a carrier, the repurposed package is received at the materials handling facility, as in 614. Upon receipt of the repurposed package, the identifier already affixed to the repurposed package is scanned, the package identified, and a destination label corresponding to the delivery destination for the repurposed package is printed and affixed to the repurposed package, as in 616. As discussed above, in some implementations, existing systems within the materials handling facility may be utilized to scan the identifier, print the label, and affix the label to the repurposed package. Likewise, the repurposed package may be routed through the materials handling facility and loaded onto the carrier vehicle for transport to the delivery destination using existing systems within the materials handling facility, as in 618.

Figure 7:
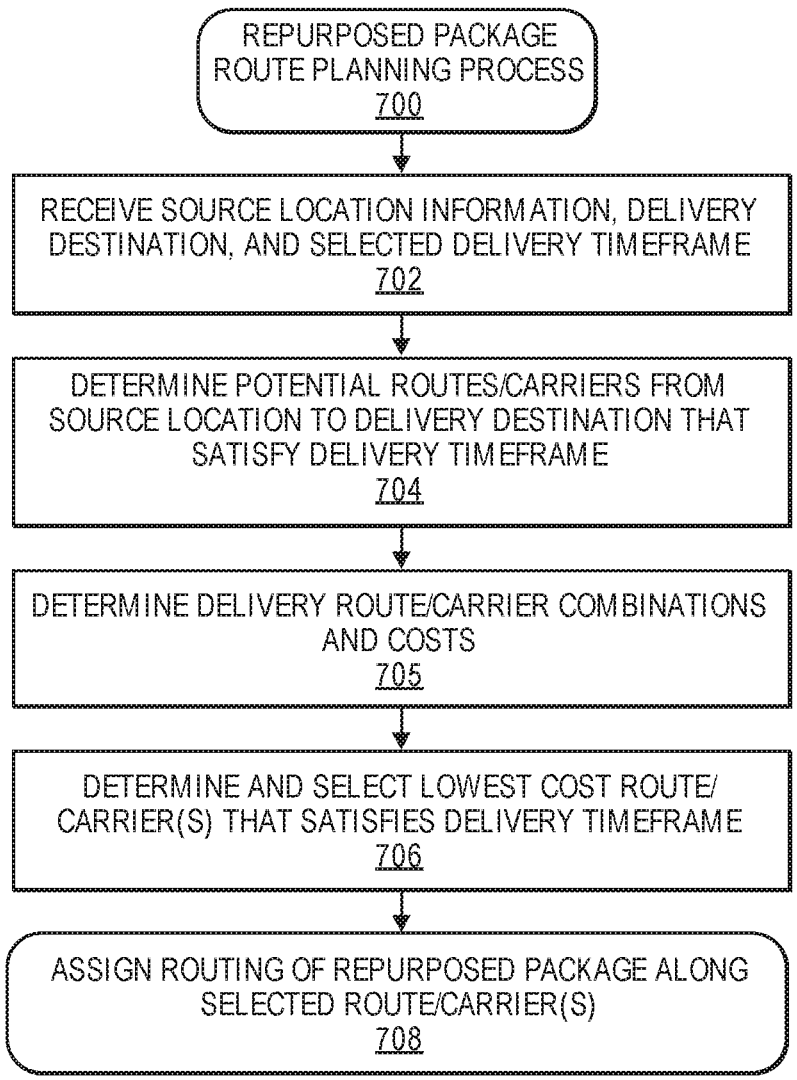
FIG. 7 is a flow diagram of an example repurposed package route planning process, in accordance with implementations of the present disclosure.

FIG. 7 is a flow diagram of example repurposed package route planning process 700, in accordance with implementations of the present disclosure. The example process 700 begins by receiving or determining the source location from which the repurposed package is to be retrieved, the delivery destination, and the selected delivery timeframe, as in 702. The source location and delivery destination may be any location specified by the user that is sending the repurposed package. For example, the source location may be the sending user's home, the current location of the sending user, a business address, a locker, etc. Likewise, the delivery destination may be the recipient's home, business address, the current location of the recipient, etc. The delivery timeframe may be the time by which the repurposed package is to be delivered to the delivery destination. Additionally, as discussed above, the delivery destination may change and/or be dynamic. For example, the recipient may change the delivery destination in response to a notification that a repurposed package is being sent to the recipient. Likewise, in some implementations, the source location may change. For example, if the repurposed package is in-route to a delivery destination and the delivery destination changes, the source location may be updated to correspond to a current location of the repurposed package or the next interim location of the package, and the example process 700 performed again based on the updated source location and updated delivery destination.

Based on the source location, delivery destination, and selected delivery timeframe, one or more potential delivery routes and carrier combinations are determined that can be utilized to ship the repurposed package from the source location to the delivery destination during the delivery timeframe, as in 704. As will be appreciated, a variety of combinations of route segments and carriers may be determined that can be used to ship the repurposed package to the delivery destination. Likewise, for each segment of the delivery route and for each carrier, a cost can be estimated, and a total cost for each delivery route and carrier combination computed, as in 705. In some implementations, the route and carrier combination may include routing the repurposed package to a materials handling facility for relabeling so that carriers along the route can utilize information on the relabeled repurposed package as the carrier would any other label to ship the repurposed package along one or more segments of the route. In other implementations, one or more route and carrier combinations may not require routing of the repurposed package to a materials handling facility or relabeling, and each of the carriers that handle the package may be able to obtain necessary information from one or more identifiers already included on the repurposed package. In still other examples, one or more of the carriers may be configured to print and affix an additional label to the repurposed package as the repurposed package is in route, so that other carriers can utilize the additional label as part of the shipping of the repurposed package. In such an example, the repurposed package may be relabeled by the carrier and need not be routed to the materials handling facility for identification and relabeling. Additionally, if the delivery destination changes while the repurposed package is in-route, a carrier can print an updated label that includes the new delivery destination and affix the label to the repurposed package while the repurposed package is in-route.

Based on the determined delivery route and carrier costs combinations, a lowest cost route and carrier combination may be selected that satisfies the delivery timeframe, as in 706. Finally, the routing of the repurposed package may be assigned to the selected route and carriers, as in 708. In some implementations, each carrier that is selected may be assigned a segment or portion of the route for which that carrier is to transport the package between interim locations along the route. In such an example, each carrier may receive information, such as retrieval time, delivery time, interim location information, etc., that is necessary for the carrier to complete the corresponding segment of the route.

Figure 8:
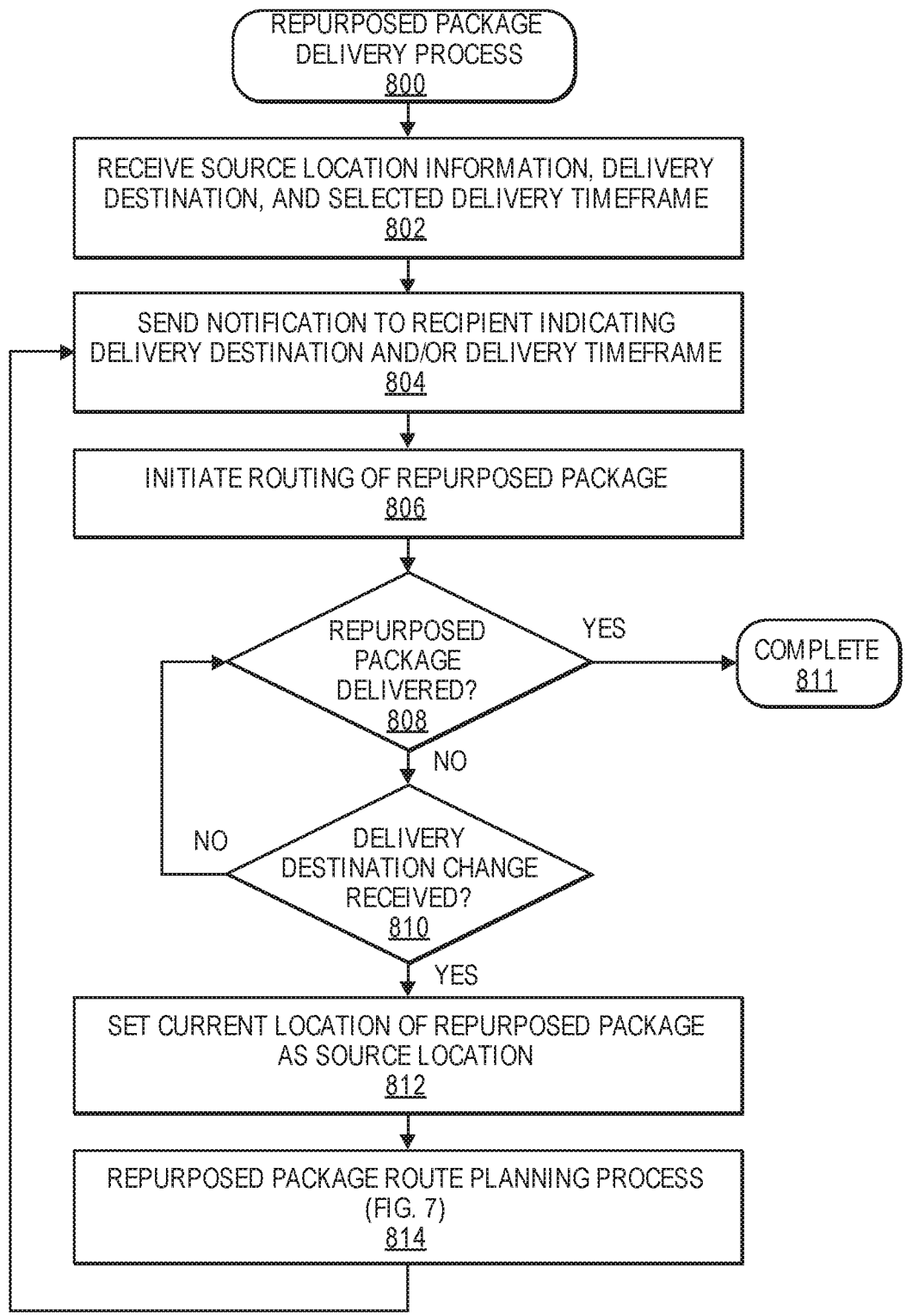
FIG. 8 is a flow diagram of an example repurposed package delivery process, in accordance with implementations of the present disclosure.

FIG. 8 is an example repurposed package delivery process 800, in accordance with implementations of the present disclosure. The example process 800 begins upon receipt of source location information, delivery destination information, and a selected delivery timeframe for a repurposed package, as in 802. In this example, the example process 800 sends a notification to a recipient of the repurposed package indicating the delivery destination specified for the repurposed package and the delivery timeframe indicating by when the repurposed package is scheduled to be delivered to the delivery destination, as in 804. In some implementations, the sender of the repurposed package, also referred to herein as the first user, may provide contact information, such as a telephone number, email address, etc., for the recipient, also referred to herein as the second user. In other examples, the system executing the example process 800 may maintain contact information for the recipient, which may be provided by the sending user, the recipient, and/or otherwise obtained, The example process also sends a notification to a carrier that is to retrieve the repurposed package from the source location and initiate routing of the repurposed package toward the delivery destination, as in 806. As the repurposed package is being routed from the source location to the delivery destination, the example process 800 determines whether the repurposed package has been delivered to the delivery destination, as in 808. It may be determined that the repurposed package has been delivered, for example, upon receipt of a delivery confirmation from the carrier that is to deliver the repurposed package to the delivery destination. Alternatively, or in addition thereto, the recipient may provide a confirmation that the repurposed package has been delivered.

If it is determined that the repurposed package has been delivered, the example process completes, as in 811. However, if it is determined that the repurposed package has not yet been delivered, a determination is made as to whether a delivery destination change has been received, as in 810. A delivery destination change may be received, for example, from a recipient that is to receive the repurposed package. For example, any time after the recipient has been notified of the repurposed package and prior to delivery of the repurposed package, the recipient may submit a request to the example process 800 to alter or change the delivery destination to a second delivery destination. As another example, if the delivery destination is dynamic (e.g., associated with the position of the recipient or a device associated with the recipient), the example process 800 may be performed each time a position update is received from the recipient or a device associated with the recipient. In some examples, a position update may only be sent, or processed, if the position of the recipient or the device associated with the recipient has changed by at least a defined amount (e.g., 100 feet).

If it is determined that a delivery destination change has not been received, the example process 800 returns to block 808 and continues. If it is determined that a delivery destination change has been received, the current location of the repurposed package is determined and set as the source location of the repurposed package, as in 812. In some implementations, the current location of the repurposed package may be the specific current location of the package. Alternatively, the current location of the package may be specified as the next transfer or interim location along the route.

Based on the updated delivery destination specified in the delivery destination change and the updated source location, the repurposed package route planning process (FIG. 7) may be performed to determine an updated route for the repurposed package, as in 814. After the updated route for the repurposed package is determined, the example process 800 returns to block 804 and continues with delivery of the repurposed package along the updated route.

Figure 9:
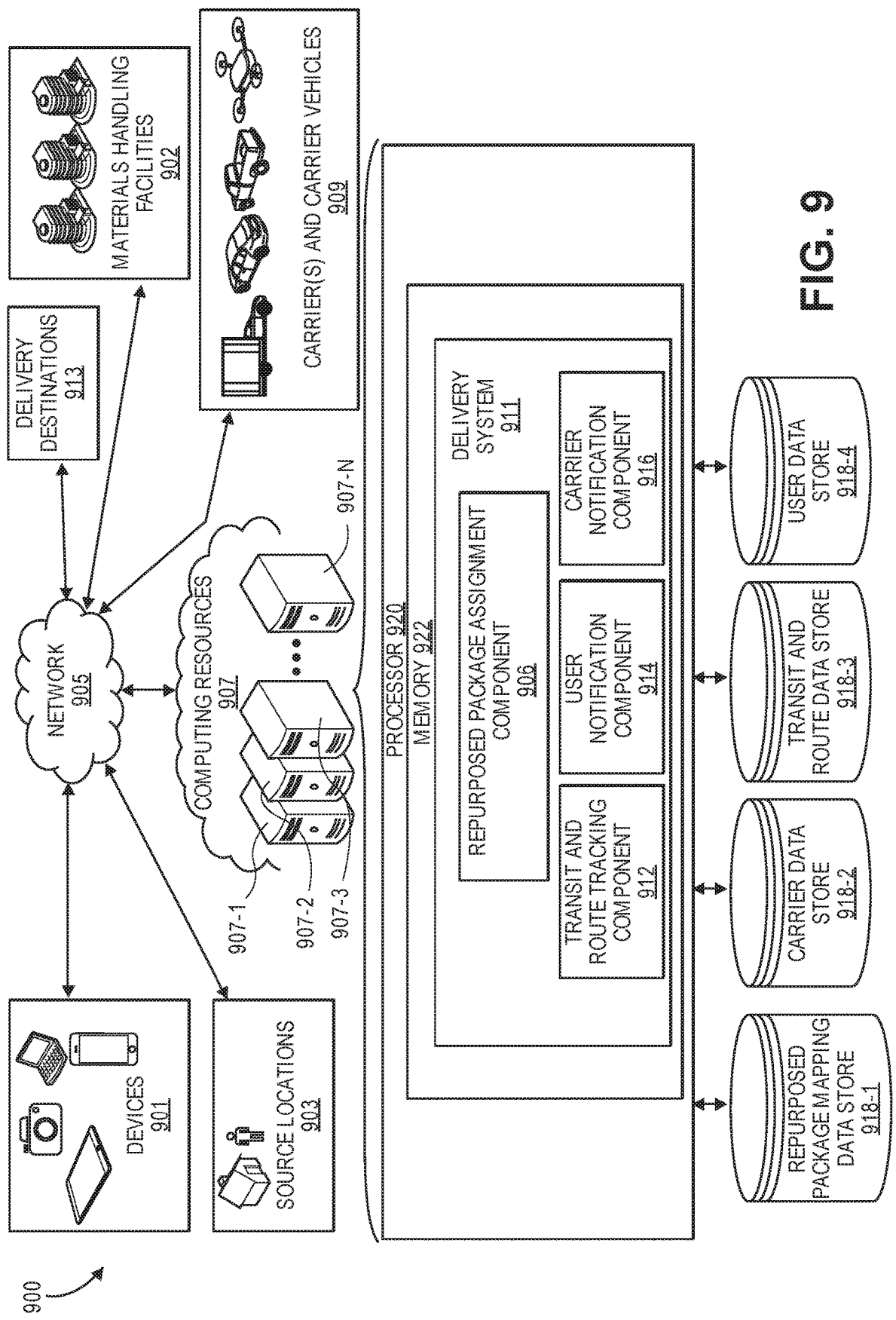
FIG. 9 is a block diagram of components of one system for enabling the use of repurposed packages, in accordance with implementations of the present disclosure.

FIG. 9 is a block diagram of components of one system for enabling repurposing of packages and identifiers already affixed to those packages for delivery of items, in accordance with implementations of the present disclosure. As shown in FIG. 9, the system 900 includes devices 901, source location 903, a delivery system 911, materials handling facilities 902, delivery destinations 913, and carriers/carrier vehicles 909.

The item source locations 903 may be any locations at which repurposed packages may be retrieved by a carrier/carrier vehicle 909 for shipment to delivery destinations 913. The delivery system 911 may coordinate and facilitate the preparation and shipment of repurposed packages using a networked computer infrastructure, including one or more physical computer servers and data store (or databases) for hosting a web site, application interface, or other interface that allows a user, through a device 901, to specify a repurposed package, delivery destination, etc., via a network 905, such as the Internet. Interaction with the interface may be implemented using the one or more servers 907, which connect or otherwise communicate with the one or more databases, the devices 901 of the users, the carriers/carrier vehicles 909, the materials handling facilities 902, and optionally the delivery destinations 913 and/or users at those delivery destinations, as well as the network 905, through the sending and receiving of digital data. Moreover, the data stores, as discussed further below, may include any type of information regarding products, source locations, users, delivery destinations, repurposed packages, carriers, etc.

The users may be any person or entity that desires to repurpose a package and utilize an identifier already included on the package to enable shipment of an item in the repurposed package to a delivery destination. For example, a user may be a person that received a prior shipment of an item included in the package that is to be repurposed.

The user may utilize one or more devices 901, such as a tablet, laptop, desktop, smartphone, wearable, voice controlled or enabled device, etc., to operate or access one or more software applications, such as an interface illustrated in FIGS. 2A through 2D. In addition to using the interface of the application executing on the device 901 to plan a repurposing of a package, in some implementations, the user may also receive notifications, delivery updates, etc., from the delivery system 911 and/or from carriers that are transporting the repurposed package to the user specified delivery destination 913.

The delivery system 911 may operate on one or more remote computing resources 907. The remote computing resources 907 may form a portion of a network-accessible computing platform implemented as a computing infrastructure of processors, storage, software, data access, and other components that are maintained and accessible via the network 905. Services, such as the delivery system 911 offered by the remote computing resources 907, do not require that the user and/or carriers have knowledge of the physical location and configuration of the system that delivers the services. Users and/or the carriers/carrier vehicles 909 may utilize one or more computing devices, such as computers, laptops, tablets, smartphones, wearables, voice controlled or enabled devices, and/or other hardware or software to communicatively couple to the remote computing resources 907 via the network 905 which may represent wired technologies (e.g., wires, USB, fiber optic cable, etc.), wireless technologies (e.g., RF, cellular, satellite, BLUETOOTH®, etc.), and/or other connection technologies. The network 905 carries data between the devices 901 of users, carriers/carrier vehicles 909, source locations 903, materials handling facilities 902, delivery destinations 913, and/or the remote computing resources 907. For example, the network 905 may carry data representative of a request from a device 901 submitted by a user to repurpose a package for shipment of an item to a delivery destination 913.

As illustrated, the remote computing resources 907 may include one or more servers, such as servers 907-1, 907-2, 907-3 . . . 907-N. These servers 907-1-907-N may be arranged in any number of ways, such as server farms, stacks, and the like that are commonly used in data centers. Furthermore, the servers 907-1-907-N may include one or more processors 920 and memory 922 which may store the delivery system 911 and execute one or more of the processes or features discussed herein.

The delivery system 911 may include one or more components that operate to perform one or more of the processes or features described herein. For example, the delivery system 911 may include a repurposed package assignment component 906, a transit and route tracking component 912, a user notification component 914, and/or a carrier notification component 916. Each of the components of the delivery system 911 may be configured to communicate with one or more other components of the delivery system 911, the devices 901 of the users, the materials handling facility 902, the delivery destinations 913, and/or the carriers/carrier vehicles 909. Likewise, one or more of the components of the delivery system 911 may be configured to store and/or access one or more of the repurposed package mapping data store 918-1, carrier data store 918-2, the transit and route data store 918-3, and/or the user data store 918-4.

The repurposed packaging assignment component 906 of the delivery system 911 may interface with the device 901, process images of packages to be repurposed, determine identifiers on those packages, and/or associate those identifiers with a user and/or delivery destination. The associations between the identifiers, user, and delivery destination may be maintained in the repurposed package mapping data store 918-1.

The transit and route tracking component 912 may communicate with carriers/carrier vehicles and/or monitor the current position of carrier vehicles. Likewise, the transit and route tracking component 912 may also maintain the transit and route data store 918-3, which may include information on carrier routes, scheduled arrivals at materials handling facilities, carrier vehicle capacities and constraints, etc. Such information may be used by the transit and route tracking component to compute potential route and carrier combinations for transport of a repurposed package from a source location to a delivery destination.

The user notification component 914 may communicate with the transit and route tracking component, and/or carriers/carrier vehicles 909, to determine a progress of the shipment of the repurposed package along segments of a route and/or to notify users and/or delivery destinations of delays or expected delivery times for repurposed packages. In a similar manner, the carrier notification component 916 may communicate with carriers or carrier vehicles to inform carriers of source locations, interim destinations, route segments, and/or delivery destinations for repurposed package.

As will be appreciated, additional or fewer components may be included in the example delivery system 911 and the ones discussed herein are provided as examples and for discussion purposes only. For example, in some implementations, the delivery system may also include a carrier management component that coordinates movement of carriers along routes or route segments, and/or a payment component that manages payment for carriers performing shipment of repurposed packages. Likewise, in other implementations some or all the components may be combined into a single component.

The carrier vehicles may include any type of vehicle capable of transporting a repurposed package. For example, carrier vehicles may include humans, human-powered vehicles (e.g., bicycles, skate boards), human operated or controlled vehicles (e.g., human operated or controlled ground-based vehicles, human operated or controlled water-based vehicles, and human operated or controlled aerial vehicles), autonomous vehicles (e.g., autonomous ground-based vehicles, autonomous water-based vehicles, and autonomous aerial vehicles), etc., to facilitate transport of repurposed packages.

The carrier vehicles and/or the operators of the carrier vehicles may be configured to communicate with the delivery system to receive navigation and/or routing instructions. In some implementations, the carriers and/or carrier vehicles may include one or more computer processors, and sensors such as a cellular telephone transceiver, a GPS receiver or sensor, an accelerometer, a gyroscope or a compass, or any other sensors or components for determining positions, velocities, accelerations or orientations of the carrier/carrier vehicles 909. The position, velocity, etc., may be transmitted over the network 905 to the delivery system and a component of the delivery system may coordinate routing of carriers to facilitate retrieval of repurposed packages from source locations and delivery of repurposed packages to delivery destinations.

As used herein, a materials handling facility may include, but is not limited to, warehouses, distribution centers, cross-docking facilities, order fulfillment facilities, packaging facilities, shipping facilities, rental facilities, libraries, retail stores, wholesale stores, museums, or other facilities or combinations of facilities for performing one or more functions of material (inventory) handling. For example, a materials handling facility may be any facility that is capable of receiving a repurposed package, detecting an identifier included on the repurposed package, and affixing a label to the repurposed package.

The computers, servers, devices, computing resources and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device or method to interact with the computers, servers, devices and the like, or to "select" a control, link, node, hub or any other aspect of the present disclosure.

Those of ordinary skill in the pertinent arts will understand that process steps described herein as being performed by a "delivery system," a "user," a "carrier," a "carrier vehicle," a "materials handling facility," or like terms, may be automated steps performed by their respective computer systems, or implemented within software modules (or computer programs) executed by one or more general purpose computers.

The delivery system, users, materials handling facility, carriers, and/or carrier vehicles may use any web-enabled or Internet applications or features, or any other client-server applications or features including electronic mail (or E-mail), or other messaging techniques, to connect to the network 905 or to communicate with one another, such as through short or multimedia messaging service (SMS or MMS) text messages. For example, carrier 909 may include or use computing hardware, such as a tablet, adapted to transmit information or data in the form of synchronous or asynchronous messages to the computing resources 907 in real time or in near-real time, or in one or more offline processes, via the network 905. Those of ordinary skill in the pertinent art will recognize that the users, carriers/carrier vehicles 909, materials handling facility 902, delivery system 911 operating on the remote computing resources 907, and/or the carrier vehicles may operate any of a number of computing devices that are capable of communicating over the network, including but not limited to set-top boxes, personal digital assistants, digital media players, web pads, laptop computers, desktop computers, electronic book readers, tablets, smart phones, wearables, voice controlled or enabled devices, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the computing resources 907 or any other computers or control systems utilized by the delivery system 911, devices 901, users, carriers/carrier vehicles 909, and/or materials handling facilities 902 and having sequences of instructions which, when executed by a processor (e.g., a central processing unit, or "CPU"), cause the processor to perform all or a portion of the functions, services and/or methods described herein. Such computer executable instructions, programs, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer executable program product including a non-transitory machine-readable storage medium having stored thereon instructions (in compressed or uncompressed form) that may be used to program a computer (or other electronic device) to perform processes or methods described herein. The machine-readable storage medium may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 4 through 7, orders in which such methods or processes are presented are not intended to be construed as any limitation on the claims, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a user terminal. In the alternative, the processor and the storage medium can reside as discrete components in a user terminal.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
    under control of one or more computing systems configured with executable instructions,
        receiving, from an application executing on a device:
            a first user identifier of a first user associated with at least one of the device or the application; and
            a first image, generated by a camera of the device, of a package to be used as a repurposed package for shipment of an item from the first user to a second user;
        processing the first image to determine that a unique identifier is not included on the package;
        sending, to the application executing on the device, a request that a user generated unique identifier be added to the package, wherein the user generated unique identifier is generated by the first user;
        subsequent to sending the request, receiving, from the application, a second image of the package;
        processing the second image to determine that the user generated unique identifier is unique compared to other identifiers maintained in a data store; and
        in response to determining that the user generated unique identifier is unique, storing, in the data store, the user generated unique identifier as a stored user generated unique identifier;

associating the first user identifier with the stored user generated unique identifier to indicate the first user as a sender of the repurposed package;

receiving, from the application, an indication of a delivery destination for the repurposed package;

associating the delivery destination with the stored user generated unique identifier;

subsequent to associating the first user identifier and the delivery destination with the stored user generated unique identifier, causing a carrier to retrieve the repurposed package; and causing the repurposed package to be shipped to the delivery destination, wherein at least a portion of a routing of the repurposed package to the delivery destination is based at least in part on the user generated unique identifier added to the package.

2. The computer-implemented method of claim 1, further comprising:

under control of the one or more computing systems configured with executable instructions, causing the carrier to transport the repurposed package to a materials handling facility;

detecting, at the materials handling facility, the user generated unique identifier added to the repurposed package; and in response to detecting the user generated unique identifier, causing a second label that includes delivery destination information for the delivery destination to be affixed to the repurposed package.

3. The computer-implemented method of claim 1, further comprising:

under control of the one or more computing systems configured with executable instructions, receiving, from the application, an image of the item to be included in the repurposed package;

processing the image to determine an identity of the item; and associating the identity of the item with the stored user generated unique identifier.

4. The computer-implemented method of claim 3, further comprising:

under control of the one or more computing systems configured with executable instructions, determining, based at least in part on the identity of the item, an approximate weight of the item; and based at least in part on the approximate weight of the item:

charging the first user a fee for shipment of the item in the repurposed package; or providing the first user a plurality of shipment timeframes for shipment of the repurposed package containing the item to the delivery destination.

5. A delivery system, comprising:

one or more processors;

a memory coupled to the one or more processors and storing program instructions that when executed by the one or more processors cause the one or more processors to at least:

receive, from a device associated with a first user:
a first user identifier corresponding to the first user;
a first image of a package; and
a delivery destination to which the package is to be shipped as a repurposed package for a shipment of an item from the first user to the delivery destination;

process the first image to determine that a unique identifier is not included on the package;

send, to the device, a request that a user generated unique identifier be added to the package, wherein the user generated unique identifier is generated by the first user;

subsequent to sending the request, receive, from the device associated with the first user, a second image of the package;

process the second image to determine that the user generated unique identifier is unique compared to other identifiers maintained in a data store; and in response to determination that the user generated unique identifier is unique, store, in the data store, the user generated unique identifier as a stored user generated unique identifier;

associate the first user identifier and the delivery destination with the stored user generated unique identifier; and cause the repurposed package to be transported from a source location to the delivery destination, wherein transport of the repurposed package utilizes, at least in part, the user generated unique identifier.

6. The delivery system of claim 5, wherein the program instructions when executed by the one or more processors further cause the one or more processors to at least:

store, in the data store, the user generated unique identifier and at least one of: the association of the stored user generated unique identifier with the first user identifier, or the association of the stored user generated unique identifier with the delivery destination.

7. The delivery system of claim 5, wherein the program instructions when executed by the one or more processors further cause the one or more processors to at least:

determine an identity of the item to be included in the repurposed package; and associate the identity of the item with the stored user generated unique identifier.

8. The delivery system of claim 5, wherein the repurposed package is transported to the delivery destination by a plurality of carriers, each carrier utilizing the user generated unique identifier to determine at least one of the delivery destination, or an interim destination along a delivery route to the delivery destination.

9. The delivery system of claim 5, wherein the program instructions when executed by the one or more processors to cause the repurposed package to be transported, further cause the one or more processors to at least:

cause the repurposed package to be transported from the source location to a materials handling facility;

detect, at the materials handling facility, the user generated unique identifier; and in response to detection of the user generated unique identifier, cause a label that includes delivery destination information for the delivery destination to be affixed to the repurposed package.

10. The delivery system of claim 5, wherein the program instructions when executed by the one or more processors further cause the one or more processors to at least:

determine a carrier that is within a defined distance of the source location; and send an instruction to the carrier to retrieve the repurposed package from the source location and transport the repurposed package to a second location as part of a transport of the repurposed package from the source location to the delivery destination.

11. The delivery system of claim 5, wherein the program instructions when executed by the one or more processors further cause the one or more processors to at least:
receive, from the device associated with the first user, an indication of the source location from which the repurposed package is to be retrieved, wherein the source location is at least one of a current location of the device, or a location specified by the first user.

12. The delivery system of claim 5, wherein the program instructions when executed by the one or more processors further cause the one or more processors to at least:
send a notification to a second user associated with the delivery destination notifying the second user of a planned delivery of the repurposed package to the delivery destination;
receive, from the second user, a request to change the delivery destination to a second delivery destination; and
update an association with the stored user generated unique identifier to replace the delivery destination with the second delivery destination so that the repurposed package will be delivered to the second delivery destination.

13. The delivery system of claim 5, wherein the program instructions when executed by the one or more processors further cause the one or more processors to at least:
determine, based at least in part on the first user identifier, a plurality of potential delivery destinations to which the repurposed package may be delivered;
send for presentation by the device, the plurality of potential delivery destinations; and
receive a selection of the delivery destination as one of the plurality of potential delivery destinations.

14. A computer-implemented method, comprising:
under control of one or more computing systems configured with executable instructions,
receiving, from an application associated with a first user, a first image of a package to be used as a repurposed package for shipment of an item from the first user to a second user;
processing the first image to determine that a unique identifier is not included on the package;
sending, to the application, a request that a user generated unique identifier be added to the package, wherein the user generated unique identifier is generated by the first user;
subsequent to sending the request, receiving, from the application, a second image of the package;
processing the second image to determine that the user generated unique identifier is unique compared to other identifiers maintained in a data store; and
in response to determining that the user generated unique identifier is unique, storing, in the data store, the user generated unique identifier as a stored user generated unique identifier;
associating the stored user generated unique identifier with the first user;
determining a delivery destination to which the repurposed package is to be delivered;
associating the delivery destination with the stored user generated unique identifier; and
causing a carrier to initiate a transport of the repurposed package toward the delivery destination.

15. The computer-implemented method of claim 14, wherein processing the second image to determine the user generated unique identifier includes processing a first indicia added to the package by the first user.

16. The computer-implemented method of claim 14, further comprising:
under control of the one or more computing systems configured with executable instructions,
determining a plurality of delivery timeframes by which the repurposed package may be delivered to the delivery destination;
sending, for presentation by the application, each of the plurality of delivery timeframes; and
receiving, from the application, a selection of a delivery timeframe from the plurality of delivery timeframes.

17. The computer-implemented method of claim 16, wherein:
a first cost is associated with a first delivery timeframe of the plurality of delivery timeframes; and
a second cost is associated with a second delivery timeframe of the plurality of delivery timeframes, wherein the second cost is different than the first cost.

18. The computer-implemented method of claim 14, further comprising:
under control of the one or more computing systems configured with executable instructions,
receiving, from the application, an indication of the item to be included in the repurposed package; and
associating the item with the stored user generated unique identifier.

19. The computer-implemented method of claim 14, wherein causing the carrier to initiate the transport includes:
determining that the carrier is within a defined distance of a source location of the repurposed package;
instructing the carrier to retrieve the repurposed package from the source location; and
instructing the carrier to transport the repurposed package to a materials handling facility.

20. The computer-implemented method of claim 14, further comprising:
under control of the one or more computing systems configured with executable instructions,
determining that the delivery destination is a dynamic location corresponding to a current location of the second user;
periodically providing position information representative of the delivery destination to the carrier to enable the carrier to navigate to the current location of the second user to deliver the repurposed package.

* * * * *